(12) United States Patent
Fukuzumi et al.

(10) Patent No.: US 7,143,835 B2
(45) Date of Patent: Dec. 5, 2006

(54) WALK-BEHIND ELECTRIC WORKING MACHINE

(75) Inventors: Yasumi Fukuzumi, Wako (JP); Norikazu Shimizu, Wako (JP); Jun Ito, Wako (JP); Masayuki Sasaoka, Wako (JP)

(73) Assignee: Honda Motor Co., Ltd. (JP)

( * ) Notice: Subject to any disclaimer, the term of this patent is extended or adjusted under 35 U.S.C. 154(b) by 9 days.

(21) Appl. No.: 10/787,724

(22) Filed: Feb. 26, 2004

(65) Prior Publication Data

US 2004/0194982 A1  Oct. 7, 2004

(30) Foreign Application Priority Data

Mar. 17, 2003 (JP) .............................. 2003-072360
Mar. 17, 2003 (JP) .............................. 2003-072500

(51) Int. Cl.
*A01B 33/02* (2006.01)

(52) U.S. Cl. ........................................ 172/119; 172/42

(58) Field of Classification Search ................. 56/11.9; 172/41, 42, 119
See application file for complete search history.

(56) References Cited

U.S. PATENT DOCUMENTS

| 3,841,069 | A | * | 10/1974 | Weck | 56/10.5 |
|---|---|---|---|---|---|
| 4,096,915 | A | * | 6/1978 | Groth | 172/42 |
| D252,879 | S | * | 9/1979 | Lessig et al. | D15/12 |
| 4,964,472 | A | * | 10/1990 | Cleworth | 171/11 |
| 5,850,882 | A | * | 12/1998 | Link | 172/41 |
| 5,960,889 | A | * | 10/1999 | McLaren | 172/37 |
| 6,181,032 | B1 | * | 1/2001 | Marshall et al. | 307/150 |
| 6,301,866 | B1 | * | 10/2001 | Marshall et al. | 56/233 |
| 6,382,325 | B1 | * | 5/2002 | Bovi | 172/41 |
| 6,513,267 | B1 | * | 2/2003 | Yoshida et al. | 37/283 |
| 6,523,334 | B1 | * | 2/2003 | Dettmann | 56/11.9 |
| 2002/0062583 | A1 | * | 5/2002 | Wakitani et al. | 37/246 |
| 2003/0178208 | A1 | * | 9/2003 | Abenroth et al. | 172/42 |

FOREIGN PATENT DOCUMENTS

| EP | 1201488 | 2/2002 |
|---|---|---|
| JP | 10136702 | 5/1998 |
| JP | 3182930 | 4/2001 |

* cited by examiner

*Primary Examiner*—Meredith C. Petravick
*Assistant Examiner*—Alexandra Pechhold
(74) *Attorney, Agent, or Firm*—Adams & Wilks

(57) ABSTRACT

A walk-behind electric working machine has a frame, an electric motor mounted on the frame, and a handle support section mounted on the frame, the handle support section having a pair of electrical terminals. A handle post has a first end portion for removable connection to the handle support section, a second end portion, and an electrical terminal disposed on an outer peripheral surface of the first end portion for electrical connection with the electrical terminals of the handle support section when the first end portion of the handle post is connected to the handle support section. A handle is removably mounted on the second end portion of the handle post and has handle portions. Grip members are mounted on the respective handle portions and are configured to be gripped by respective hands of an operator. An operation button controls power to operate the electric motor when the electrical terminal of the handle post is electrically connected to the electrical terminals of the handle support section.

3 Claims, 23 Drawing Sheets

FIG.23A
(PRIOR ART)
FIG.23B
(PRIOR ART)
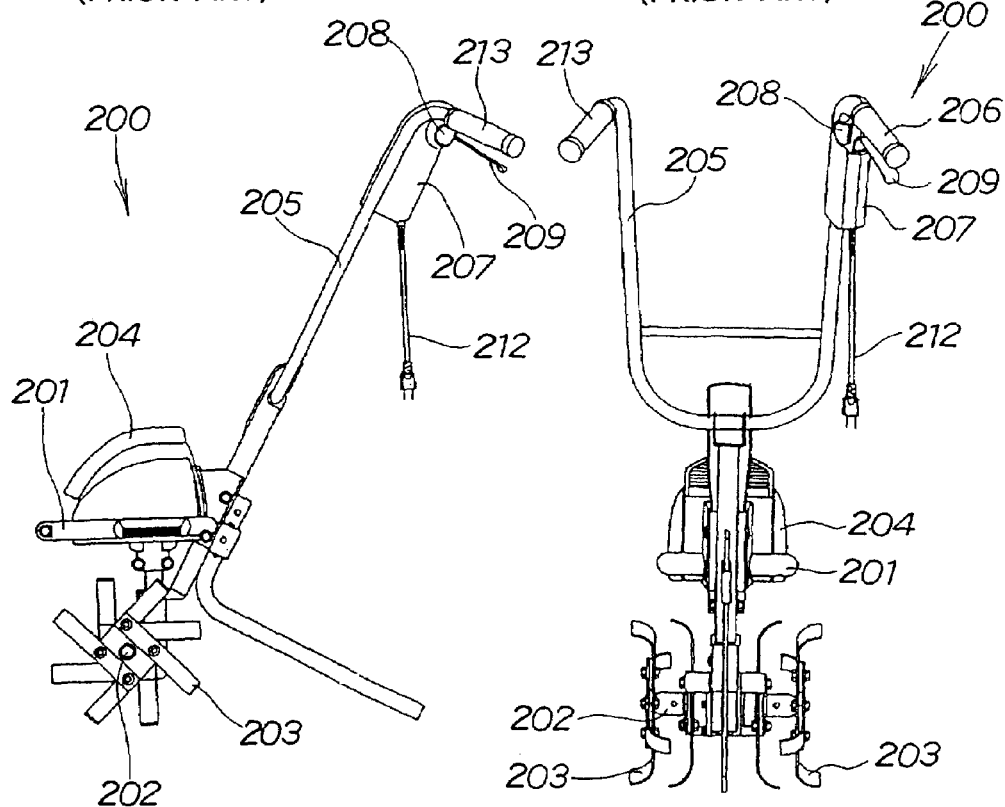
FIG.23C
(PRIOR ART)
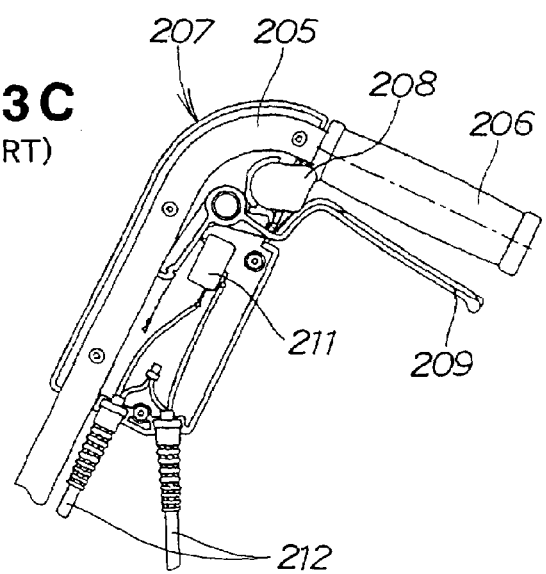

WALK-BEHIND ELECTRIC WORKING MACHINE

BACKGROUND OF THE INVENTION

1. Field of the Invention

The present invention relates to walk-behind electric working machines having a working unit driven by an electric motor.

2. Background Information

Walk-behind electric working machines haven been known, in which a rotary working unit is driven by an electric motor to perform desired soil cultivating work or weeding work (see, for example, Japanese Patent Laid-Open Publication No. HEI-10-136702 and Japanese Patent No. 3182930).

FIGS. 23A–23C hereof show the electric working machine 200 disclosed in the HEI-10-136702 publication, which includes a cultivating shaft 202 mounted to a lower portion of a machine body frame 201, cultivating claws 203 provided on the cultivating shaft 202 and an electric motor (not shown) mounted on an upper portion of the body frame 201. The motor is covered with a cover 204. The electric working machine 200 also includes an operating handle 205 extending rearward from the body frame 201, and a switch case 207 is mounted on a portion of the operating handle 205 adjacent to a right grip 206. Safety lock button 208 and switch lever 209 are mounted on the switch case 207. The switch lever 209 can be operated by the human operator holding the lever while depressing the safety lock button 208 with the thumb of his or her hand grasping the right grip 206. The motor can be rotated only when a micro switch 211 is kept ON via the switch lever 209. Namely, the electric working machine 200 employs a dual operation scheme which, for activation of the motor, requires operation of the switch lever 209 while depressing the safety lock button 208, so that the motor can be activated only when the human operator actually so desires. Each reference numeral 212 represents a wire harness (a group of conductors or leads), and 213 a left grip.

However, in the case of the working machine 200 disclosed in the HEI-10-136702 publication, the human operator has to activate the motor by holding the switch lever 209 with one or more fingers, other than the thumb, of the right hand while holding the left and right grips 213 and 206 with both hands and depressing the safety lock button 208 with the thumb of the right hand; namely, the human operator has to perform, with only the right hand grasping the right grip 206, the two operations of holding the switch lever 209 while depressing the safety lock button 208, which is very troublesome and increases burdens on the human operator. Therefore, there has been a demand for an improved electric working machine which facilitates the two operations for rotating the motor and thereby reduces the burdens on the human operator.

FIG. 24 shows the working machine 300 disclosed in Japanese Patent No. 3182930, in which an electric motor 302 is provided on a machine body frame 301. Working unit cover 303 covering a rotary working unit 304 is disposed underneath the motor 302, and the rotary working unit 304 is rotatably mounted under the cover 303. The disclosed working machine 300 also includes an operating handle 305 extending rearward from a rear end portion of the body frame 301 and provided with an operation panel 306 having a main switch 307. Forward rotation switch 309 is provided near a left grip 308 of the operating handle 305, and a reverse rotation switch 311 is provided near a right grip 310.

The machine body frame 17 includes a cylindrical handle support section 51 and a cylindrical resisting-bar support section 57, both integrally formed therewith, and the handle support section 51 extends rearwardly and upwardly from a rear upper portion of the machine body frame 17 while the resisting-bar support section 57 extends downwardly from a rear upper portion of the machine body frame 17. The operating handle section 18 is secured to the machine body frame 17, by inserting a proximal end portion 122a of the handle post 122 in a tubular portion or supporting pipe 126 of the handle support section 51 and locking it via a locking lever 141 of a handle post locking mechanism 135.

Specifically, the human operator has to disconnect the machine-body-side wire harness segment 312 and the handle-side harness segment 312 by disconnecting the mating connectors and then detaching the operating handle 305 from the body frame 301. Thus disconnecting the connectors requires extra time and labor. Also, the harness segments 312 disconnected at the connectors have to be held together in one place on or near the body frame 301 and in one place on or near the operating handle 305, which would further add to the necessary time and labor.

As one possible way to save the time and labor, there may be used a wireless-type electric working machine capable of wireless communication so that the electric motor can be controlled, in response to operation any of the operating sections on the handle, via wireless communication and hence the operating handle can be readily detached from the body frame 301. However, in the wireless-type electric working machine, even after removable of the operating handle from the machine body, operating any of the operating sections on the handle would transmit, to the machine body, an operation signal that might undesirably activate the motor against intention of the human operator or the like. To avoid such unintended activation of the motor, it is conceivable to provide a main switch on the operating handle so that the electric motor can be prevented from unintended activation while the main switch is OFF. However, the human operator may forget to turn off the main switch after the removable of the operating handle from the machine body frame, in which case the motor would be undesirably activated in response to unintended operation of any of the operating sections of the handle.

SUMMARY OF THE INVENTION

In view of the foregoing prior art problems, there has been a demand for an improved walk-behind electric working machine which allows an operating handle to be readily detached from a machine body without wire harness connectors having to be disconnected and which can prevent an electric motor from being activated in response to unintended operation of an operating section on the handle after detachment of the handle from the machine body.

To accomplish the above-mentioned object, the present invention provides a walk-behind electric working machine, which comprises: a machine body frame; an electric motor provided on the machine body frame for driving a working unit of the electric working machine; a handle support section provided on a rear portion of the machine body frame for removable attachment thereto of a proximal end portion of a handle post; a handle attached to the handle post and having left and right grip portions; a work preparing lever provided on a lower portion of one of the left and right grip portions; a work starting operation button provided at a position of other of the left and right grip portions close to a centerline of the machine body; and a control section for controlling the electric motor to operate in response to operation of both the work preparing lever and the work starting operation button.

In the walk-behind electric working machine of the present invention, the motor can be activated by the human operator operating the work preparing lever with one hand and the work starting operation button with the other hand while holding the left and right grip portions with both hands; thus, the motor can be activated only when the human operator actually so desires.

The work preparing lever and work starting operation button, which are provided distributively on the left and right grip portions, are operable separately with both hands of the human operator. This arrangement eliminates a need for simultaneously operating the work preparing lever and work starting operation button with only one of the hands holding the grip portions, thereby facilitating manipulation of these lever and button. Thus, it is possible to enhance the operability of the electric walk-behind working machine and reduce the burdens on the human operator. In addition, because the work preparing lever and work starting operation button are operable with both hands holding the left and right grip portions, the human operator can maneuver the machine while always keeping the machine in a stable posture.

Further, with the work preparing lever and work starting operation button provided distributively on the left and right grip portions, the respective weights of the left and right grip portions can almost equal each other, which achieves weight balance between the left and right sides of the working machine and thus can enhance the linear traveling capability and operability of the machine.

Furthermore, with the work starting operation button provided at a position of the other grip portion close to the centerline of the machine body, the work starting operation button can be made easier to operate with the thumb of the hand gripping the other grip portion, so that the operability of the work starting operation button, having a higher frequency of use during work, can be enhanced and the burdens of the human operator can be reduced even further.

Preferably, the one grip portion further has a speed changing operation button for changing the rotation speed of the electric motor. Namely, because the speed changing operation button is provided on the one grip portion having the work preparing lever that continues to be operated during the work by the machine, it can be manipulated with the same hand continuing to operate the work preparing lever.

Moreover, with the proximal end portion of the handle post removably attached to the handle support section on a rear portion of the machine body frame, the walk-behind electric working machine can assume a compact size by detaching the handle post from the handle support section, when the machine is to be transported or stored in a desired place. This arrangement can minimize a space necessary for transport or storage of the machine.

Further, in a preferred embodiment, the handle support section includes a machine-body-side terminal connected to the control section, and the proximal end portion of the handle post includes a handle-side terminal that is connected to the machine-body-side terminal when the proximal end portion is attached to the handle support section. In this case, the control section controls the electric motor to be in an operable condition when the handle-side terminal is connected to the machine-body-side terminal, but to be in a non-operable condition when the handle-side terminal is disconnected from the machine-body-side terminal. The electric motor can be activated by the human operator operating the work preparing lever and work starting operation button provided distributively as operating sections on the left and right grip portions of the handle.

The electric motor can be brought to the non-operable condition by disconnecting the handle-side terminal from the machine-body-side terminal. Thus, with the handle post removed or detached from the handle support section, the motor is prevented from being activated when any of the operating sections on the handle has been operated.

The electric working machine, where the handle post is detachable from the handle support section, may be of either a wired type or a wireless type.

Even in the case where the basic principles of the present invention are applied to the wired-type walk-behind electric cultivating machine, connecting a handle-side wire harness segment to the handle-side terminal and connecting a machine-body-side wire harness segment to the machine-body-side terminal can dispense with conventional connectors heretofore used for connecting the machine-body-side wire harness segment and handle-side wire harness segment. Therefore, in this case, no troublesome operation is necessary for disconnecting the connectors to thereby disconnect the machine-body-side wire harness segment and handle-side wire harness segment, when the handle post is to be detached from the handle support section. In addition, there is no need to hold the disconnected machine-body-side harness segment in one place on or near the body frame and the disconnected handle-side harness segment in one place on or near the handle. Therefore, the inventive arrangement allows the handle post to be readily detached from the handle support section without extra time and labor.

In the case where the basic principles of the present invention are applied to the wireless-type walk-behind electric cultivating machine, there is no need to provide a main switch on the handle for preventing the motor from being activated, in response to operation of any of the operating sections on the handle, when the handle post is detached from the handle support section. This arrangement can eliminate the need for turning off the main switch each time the handle post is detached from the handle support section.

BRIEF DESCRIPTION OF THE DRAWINGS

Certain preferred embodiments of the present invention will hereinafter be described in detail, by way of example only, with reference to the accompanying drawings, in which:

FIGS. 23A, 23B and 23C are views showing a first example of conventional electric working machines.

DETAILED DESCRIPTION OF THE PREFERRED EMBODIMENTS

Figure 1:
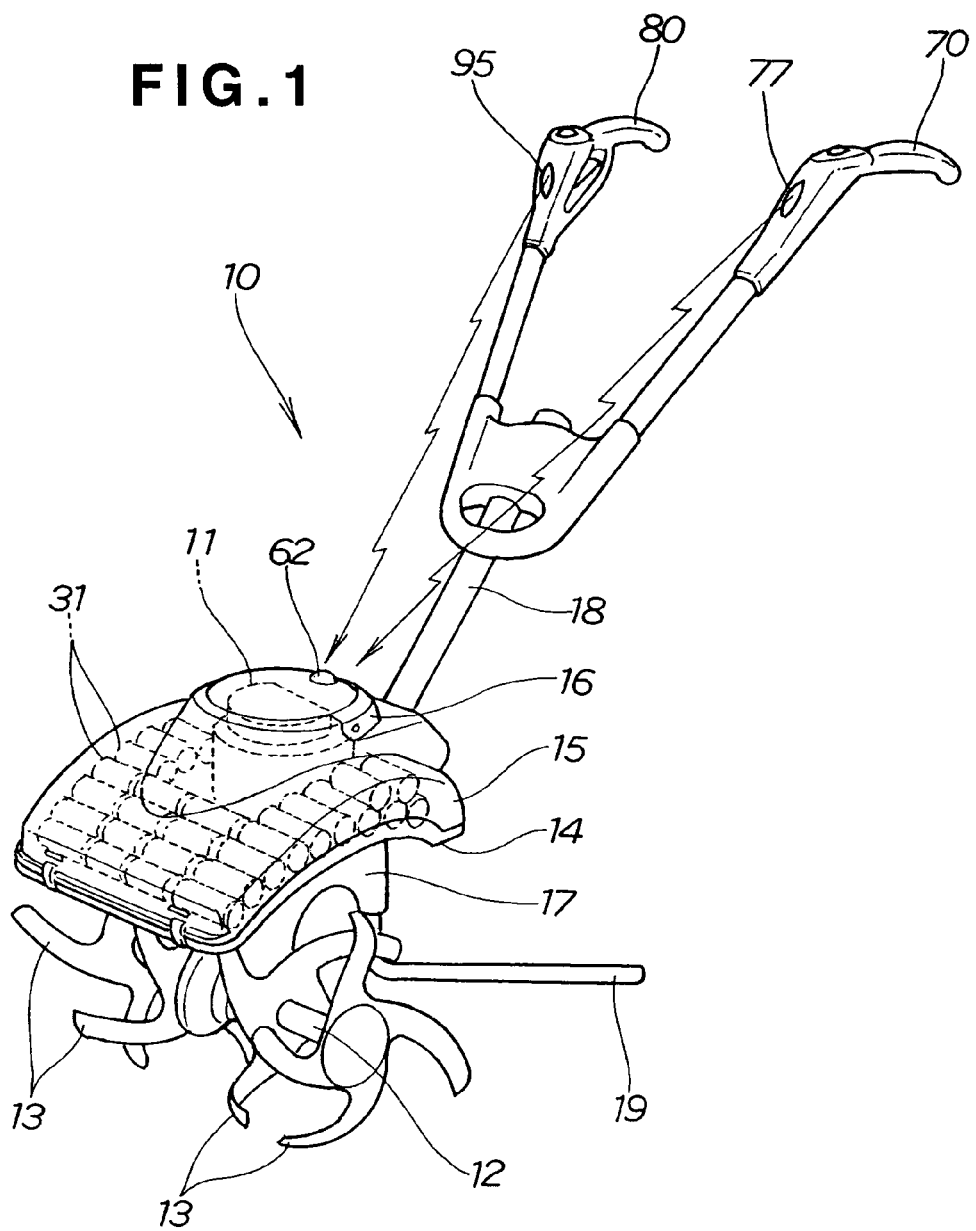
FIG. 1 is a perspective view of a walk-behind electric working machine in accordance with an embodiment of the present invention.

Walk-behind electric working machine of the present invention will be detailed below as being implemented, for example, as a walk-behind electric cultivating machine.

Reference is now made to FIGS. 1–8 showing a walk-behind electric cultivating machine in accordance with an embodiment of the present invention.

The walk-behind electric cultivating machine 10 is a self-propelled, front-tine cultivating machine, which is constructed to transmit driving power from an electric motor 11 (i.e., drive source of the machine 10) to a cultivating shaft 12 so that the machine can travel on a field through rotation of a plurality of cultivating claws 13 provided at left and right end portions of the cultivating shaft 12 while cultivating the field with the rotating cultivating claws 13. The cultivating claws 13, which constitutes a working unit of the machine 10, are covered with a fender 14 provided over the claws 13, and an upper cover 15 covers an upper surface of the fender 14. The cultivating shaft 12 is a rotation shaft extending horizontally between opposed inner side surfaces of a machine body frame 17 (i.e., in a widthwise direction of the body frame 17, i.e. machine body), and the fender 14 is a cover designed primarily to prevent scattering of earth and sand.

The electric cultivating machine 10 has a very small size so that the human operator can carry the machine by just grasping with his or her single hand a carrying handle 16 provided on the top of the upper cover 15. The cultivating machine 10 includes an operating handle section 18 extending rearwardly and upwardly from a rear portion of the machine body frame 17, and a resisting bar 19 extending downwardly from a rear lower portion of the machine body frame 17.

Figure 2:
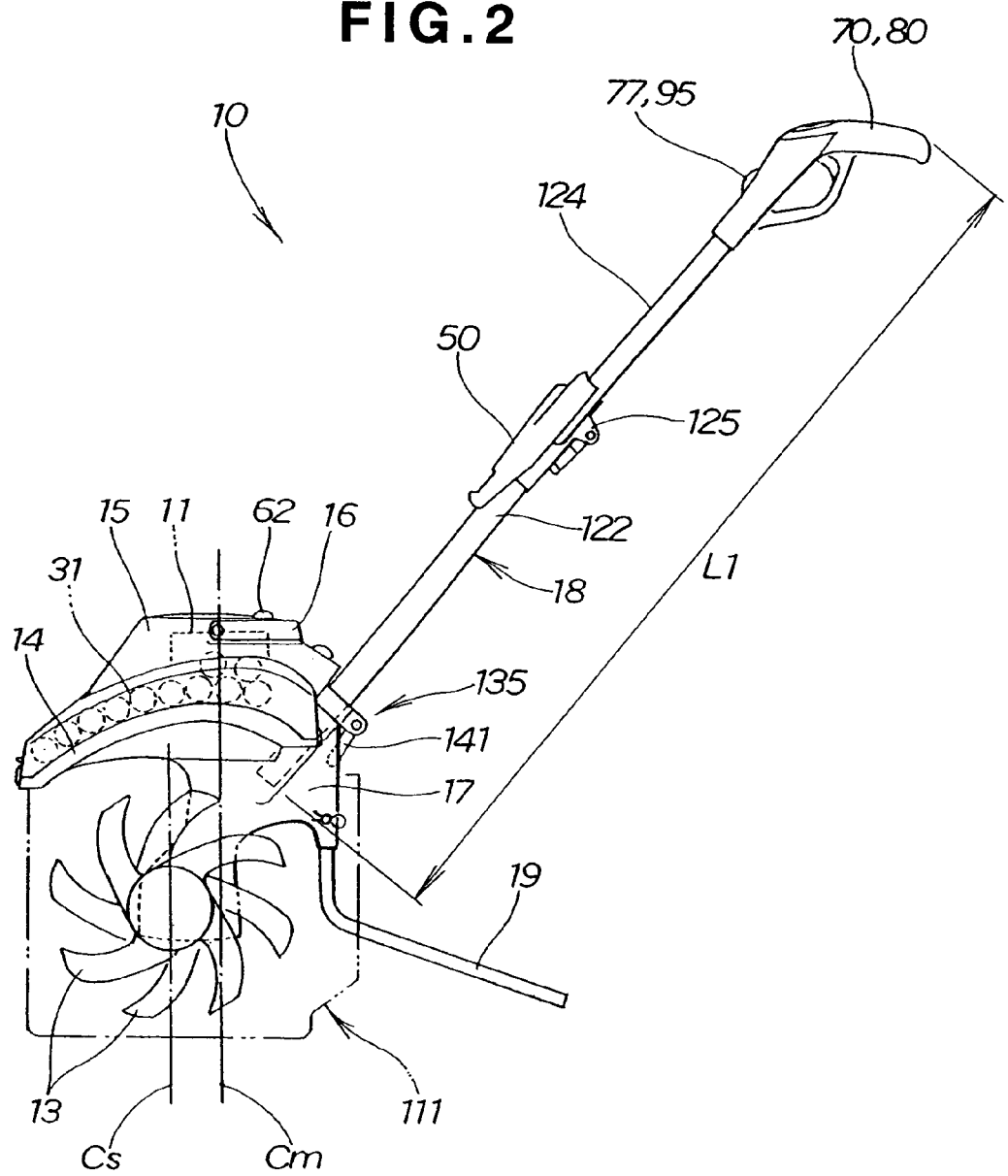
FIG. 2 is a left side view of the electric working machine of the invention shown in FIG. 1.

The operating handle section 18 includes a handle 124 slidably connected to a handle post 122, as seen in FIG. 2. Vertically sliding the handle 124 along the handle post 122 can set left and right grip members 70 and 80 (also shown in FIG. 1) at an appropriate height corresponding to a height and preference of the human operator.

Desired work can be performed by the human operator manipulating the operating handle section 18 while walking behind the machine 10. Details of the operating handle section 18 will be discussed later with reference to FIGS. 14–22.

The resisting bar 19 can be inserted in the earth not only to set a desired cultivating depth of the cultivating claws 13, but also to produce a resisting force against a traction force by the cultivating claws 13.

The cultivating shaft 12 and cultivating claws 13 can be cleaned or washed with water, by putting a lower half portion of the machine body frame 17 and cultivating claws 13 in a cleaning box 111 depicted by imaginary line in FIG. 2. At that time, the fender 14 is placed and set over the top of the cleaning box 111 opening upwardly, to thereby function as a lid of the cleaning box 111.

Figure 3:
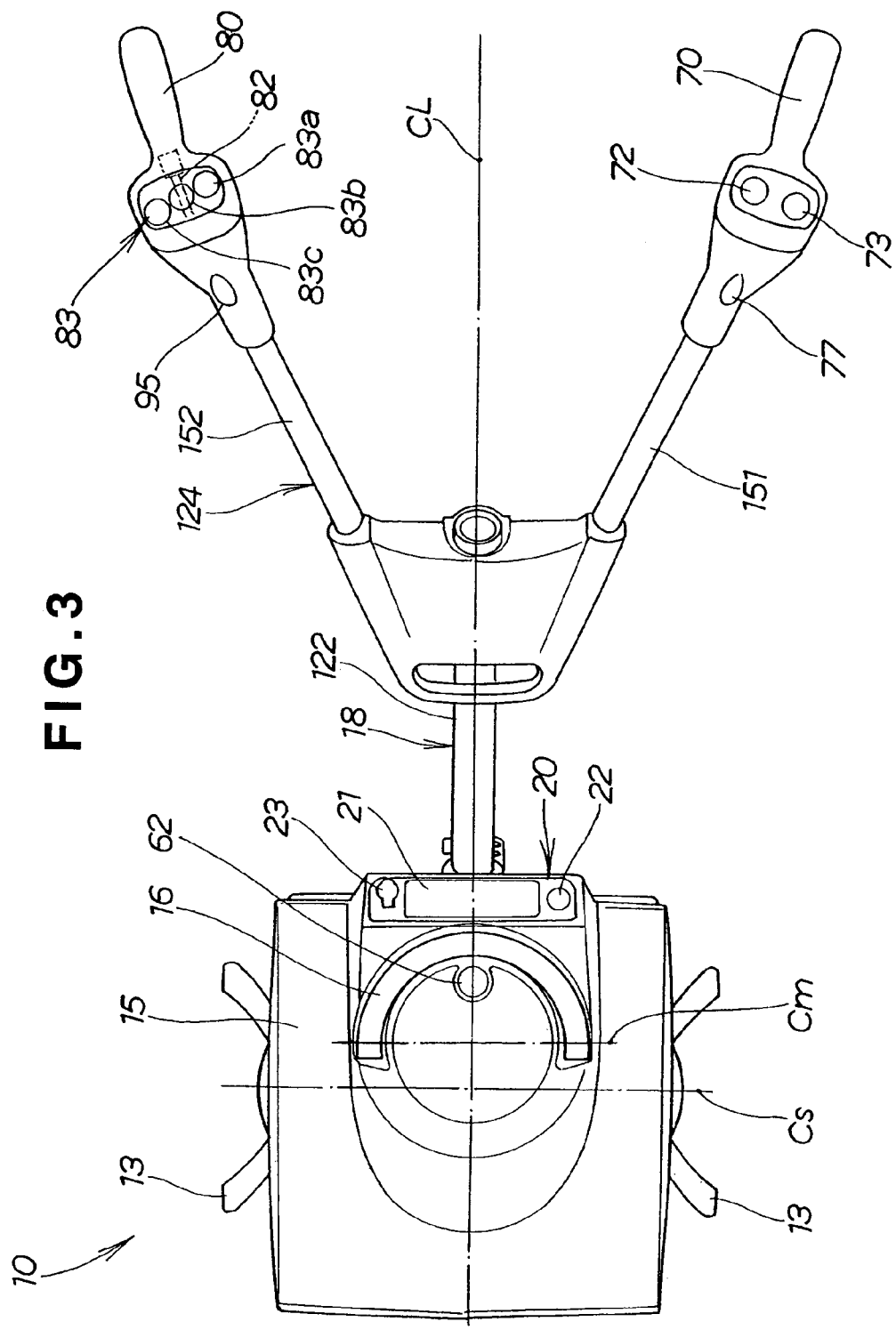
FIG. 3 is a top plan view of the electric working machine of the invention.

As shown in FIG. 3, the electric cultivating machine 10 includes a control box 20 provided on a rear upper portion of the upper cover 15, and the control box 20 includes a display section 21 positioned along a longitudinal centerline CL between opposite sides of the body frame 17, a cleaning switch 22 disposed to the left of the display section 21, and a charging socket 23 disposed to the right of the display section 21.

The operating handle section 18 is bifurcated at its intermediate point into left and right handle portions, so that the section 18 as a whole takes a Y shape as viewed in plan. Namely, the operating handle section 18 includes the handle post 122 extending rearward from a rear portion of the body frame 17, and the handle 124 having left and right handle portions 151 and 152 extending rearward from a rear end portion of the handle post 122. The left and right handle portions 151 and 152 include the left and right grip members 70 and 80 secured to their respective rear ends. Details of the left and right grip members 70 and 80 will be later discussed with reference to FIG. 9, FIGS. 10A–10C and FIGS. 11A–11C.

Figure 4:
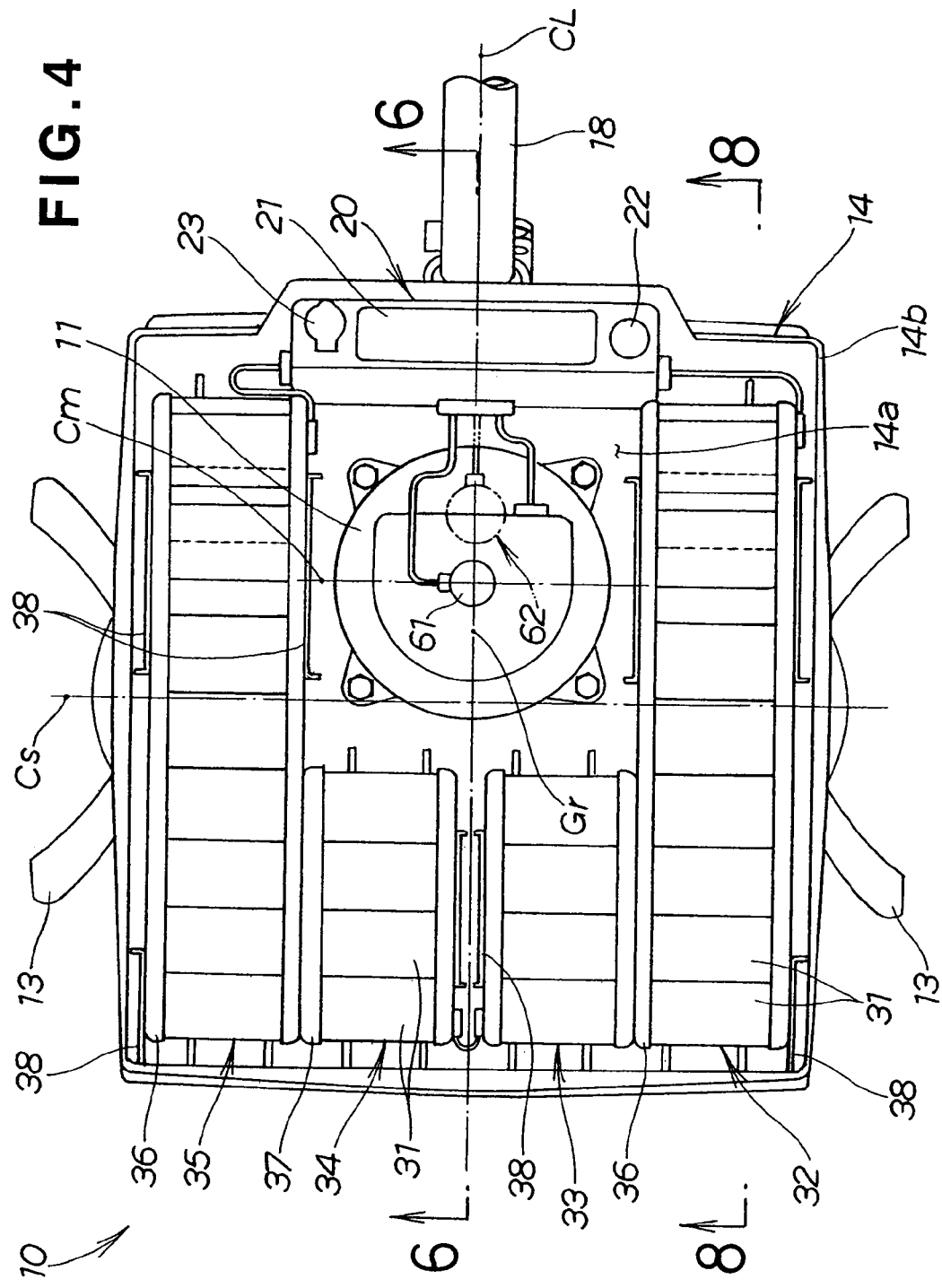
FIG. 4 is an enlarged top plan view of the electric working machine of FIG. 3 with an upper cover removed.

As illustrated in FIG. 4, the electric motor 11 is disposed on the longitudinal centerline CL, and a plurality of rows of batteries 31 are positioned distributively around and adjacent to the outer peripheral surface of the motor 11. Specifically, the batteries 31 are arranged symmetrically about the longitudinal centerline CL of the machine body over a practically entire upper surface of the fender 14 having a substantial rectangular shape as viewed in plan.

More specifically, in the illustrated example, four rows of the batteries 31 are arranged in the widthwise (left-and-right) direction of the machine body, and the four rows consist of the first (or left outer) row 32, second (or left inner) row 33 located in front of the motor 11, third (or right inner) row 34 located in front of the motor 11 and fourth (or right outer) row 35. Namely, the plurality of batteries 31 are positioned to the left and right and in front of the motor 11; in other words, the batteries 31 are positioned distributively around and adjacent to the motor 11.

Figure 5:
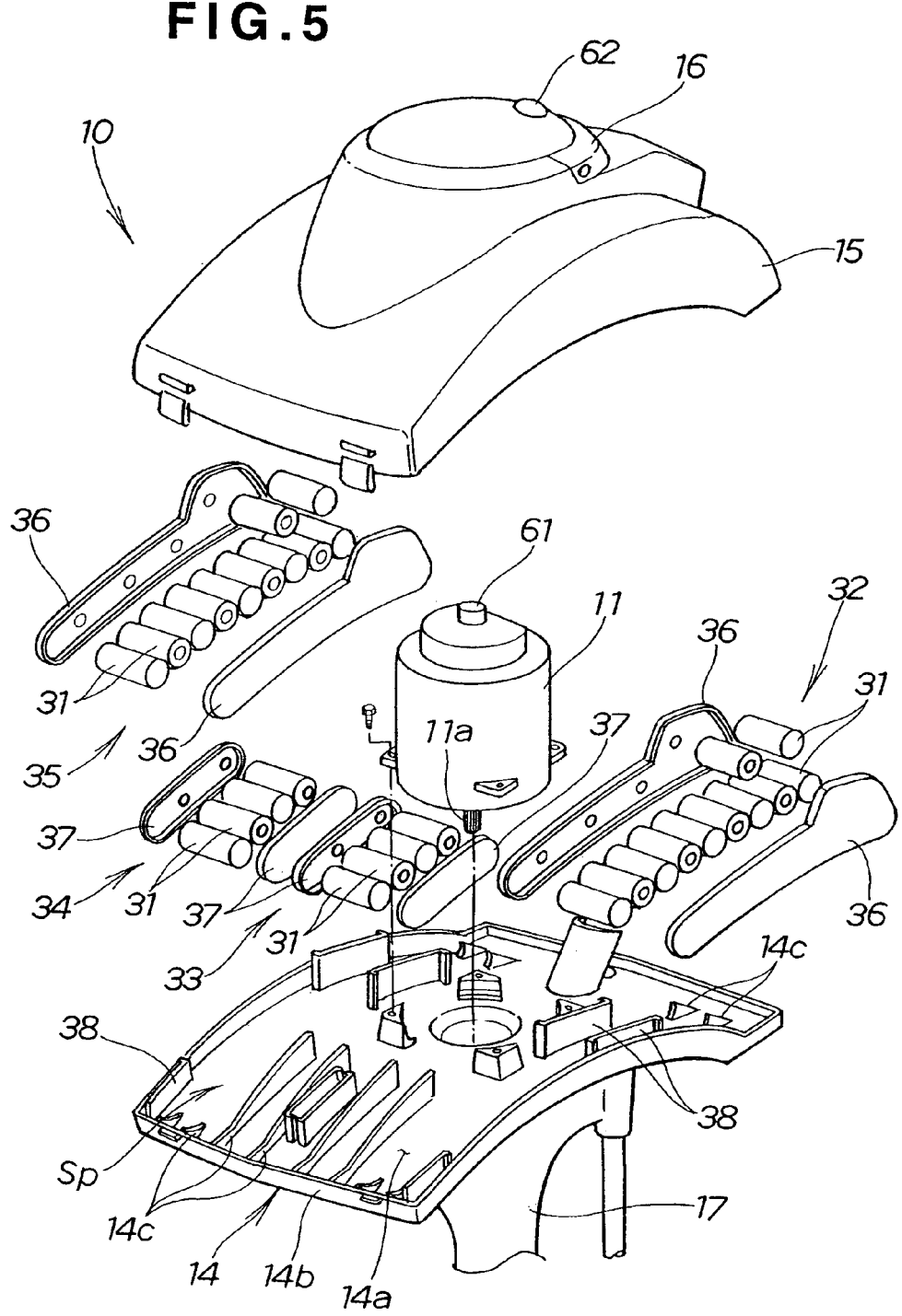
FIG. 5 is an exploded perspective view of a fender, upper cover, electric motor and batteries constituting the electric working machine of FIG. 1.

As clearly seen in FIG. 5, the batteries 31 are each oriented in the widthwise (left-and-right) direction of the machine body frame 17, and each of the rows 32–35 is held between longer battery holder members 36 or between shorter battery holder members 37 and placed on the fender 14.

Specifically, the fender 14 is a rectangular member provided integrally on an upper end portion of the machine body frame 17. The fender 14 is generally in the form of a rectangular tray having a generally flat bottom portion 14a and a peripheral edge portion 14b protruding from four edges of the bottom portion 14a. The bottom portion 14a has a plurality of supporting ridges 14c for supporting therebetween the batteries 31. The upper cover 15 is removably attached to the fender 14. The motor 11 and batteries 31 are accommodated in a space Sp defined between the fender 14 and the upper cover 15. The motor 11 is bolted to an upper portion of the machine body frame 17, i.e. upper surface portion of the fender 14.

This way, the motor 11 and batteries 31 are mounted on the upper portion of the machine body frame 17, and the battery holder members 36 and 37 are positioned via resilient supporting pieces 38.

Figure 6:
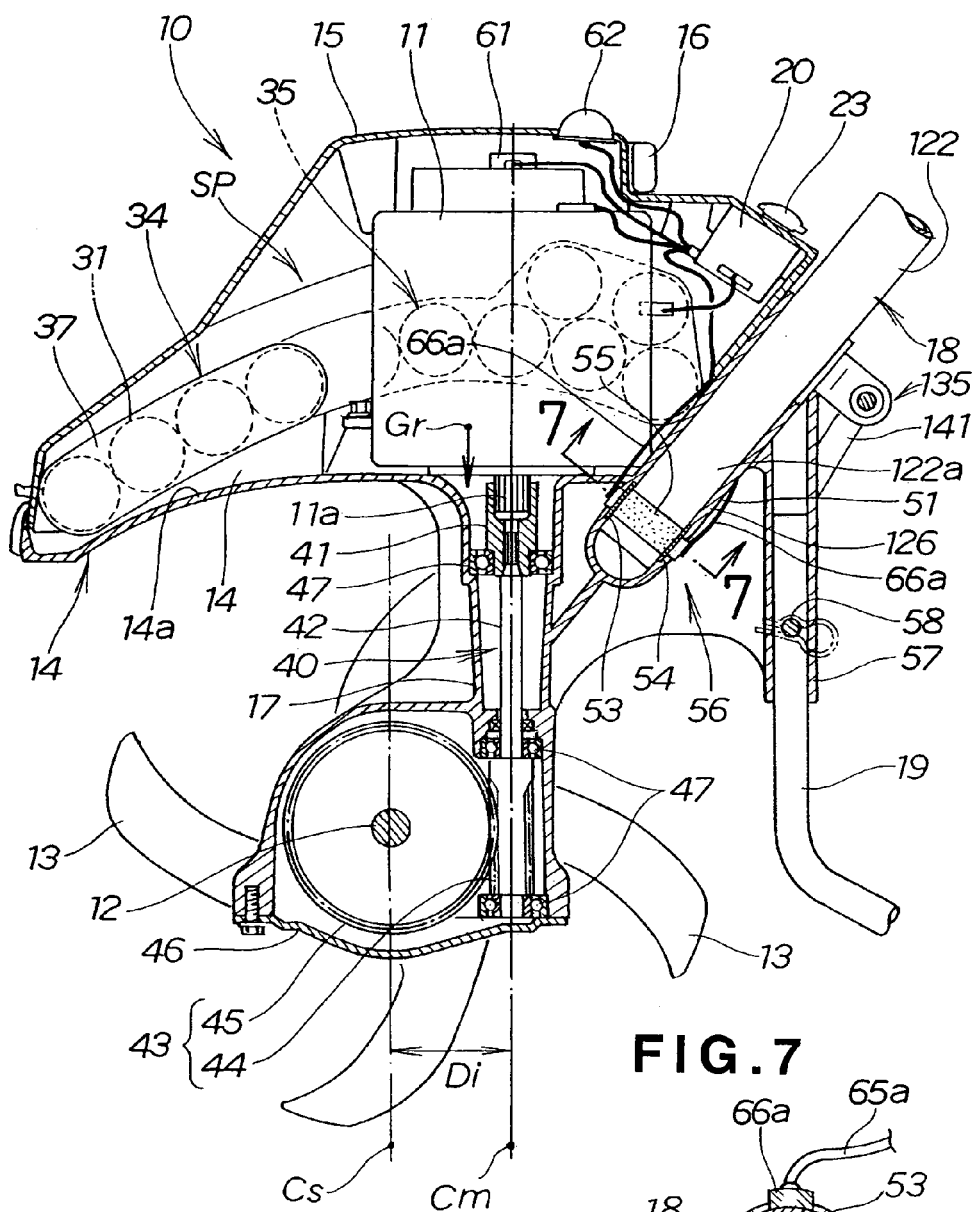
FIG. 6 is a sectional view taken along the 6—6 line of FIG. 4.

As illustrated in FIG. 6, the cultivating shaft 12, cultivating claws 13 and transmission mechanism 40 are disposed in and mounted to a lower portion of the machine body frame 17. Power from the motor 11 is transmitted via the transmission mechanism 40 and cultivating shaft 12 to the claws 13. The transmission mechanism 40 is positioned immediately below a downwardly-extending rotation shaft 11a of the motor 11 (i.e., motor shaft 11a).

The transmission mechanism 40 includes a substantially-vertical transmission shaft 42 positioned coaxially with the motor shaft 11a connected thereto via a coupling 41, and a worm gear mechanism 43 for transmitting power from a lower portion of the transmission shaft 42 to the horizontal cultivating shaft 12. The worm gear mechanism 43 includes a worm gear 44 provided on the transmission shaft 42, and a worm wheel 45 spline-coupled to the cultivating shaft 12.

The transmission shaft 42 and the worm gear mechanism 43, together constituting the transmission mechanism 40, are collectively accommodated inside the machine body frame 17 functioning as a transmission case. Reference numeral 46 represents a lid, and 47 a bearing.

As also seen in FIG. 6, the centerline Cm of the motor 11, i.e. the centerline Cm of the motor shaft 11a, is spaced rearwardly from the centerline Cs of the cultivating shaft 12 by a distance Di. The distance Di is determined in accordance with sizes of the worm gear 44 and worm wheel 45.

Note that the worm gear mechanism 43 may be replaced with another type of gear mechanism, such as a bevel gear mechanism or screw gear mechanism. If the worm gear mechanism 43 is replaced with a bevel gear mechanism, the centerline Cm of the motor shaft 11a can be set to coincide with the centerline Cs of the cultivating shaft 12.

The machine body frame 17 includes a cylindrical handle support section 51 and a cylindrical resisting-bar support section 57, both integrally formed therewith, and the handle support section 51 extends rearwardly and upwardly from a rear upper portion of the machine body frame 17 while the resisting-bar support section 57 extends downwardly from a rear upper portion of the machine body frame 17. The operating handle section 18 is secured to the machine body frame 17, by inserting a proximal end portion 122a of the handle post 122 in a supporting pipe of the handle support section 51 and locking it via a locking lever 141 of a handle post locking mechanism 135.

Figure 7:
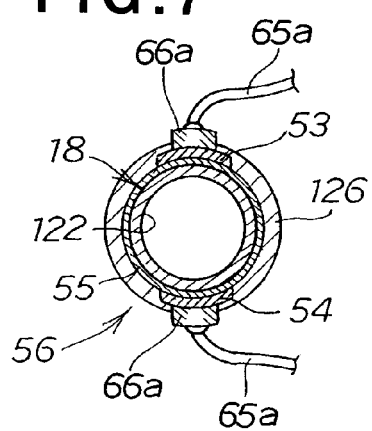
FIG. 7 is a sectional view taken along the 7—7 line of FIG. 6.

Specifically, as illustrated in FIG. 7, a pair of machine-body-side terminals 53 and 54 (first electrical terminals) are provided within the supporting pipe 126 of the handle support section 51, and terminals 66a coupled to wire harnesses 65a are connected at the other side to the machine-body-side terminals 53 and 54. The wire harnesses 65a are connected to a control section 102 (see FIG. 12) within the control box 20, so that the machine-body-side terminals 53 and 54 are connected to the control section 102.

The operating handle section 18 also includes a handle-side terminal (a second electrical terminal in the form of a movable electrode) 55 provided on an outer peripheral surface of the proximal end portion 122a of the handle post 122.

Combination of the pair of machine-body-side terminals 53, 54 and the handle-side terminal 55 constitutes a handle attachment switch 56. The fixed terminals 53 and 54 can be electrically interconnected via the movable terminal 55 by inserting the proximal end portion 122a of the handle post 122 from above into the supporting pipe 126 of the handle support section 51.

The resisting bar 19 is inserted in the resisting-bar support section 57 from below and secured to the support section 57 via a pin 58.

Rotation sensor 61 for detecting a rotating speed of the motor 11 is provided on the top of the motor 11. The third battery row 34 has four batteries 31 disposed side by side in the front-and-rear direction of the machine body. Receiver 62 is disposed on a rear upper portion of the upper cover 15.

Figure 8:
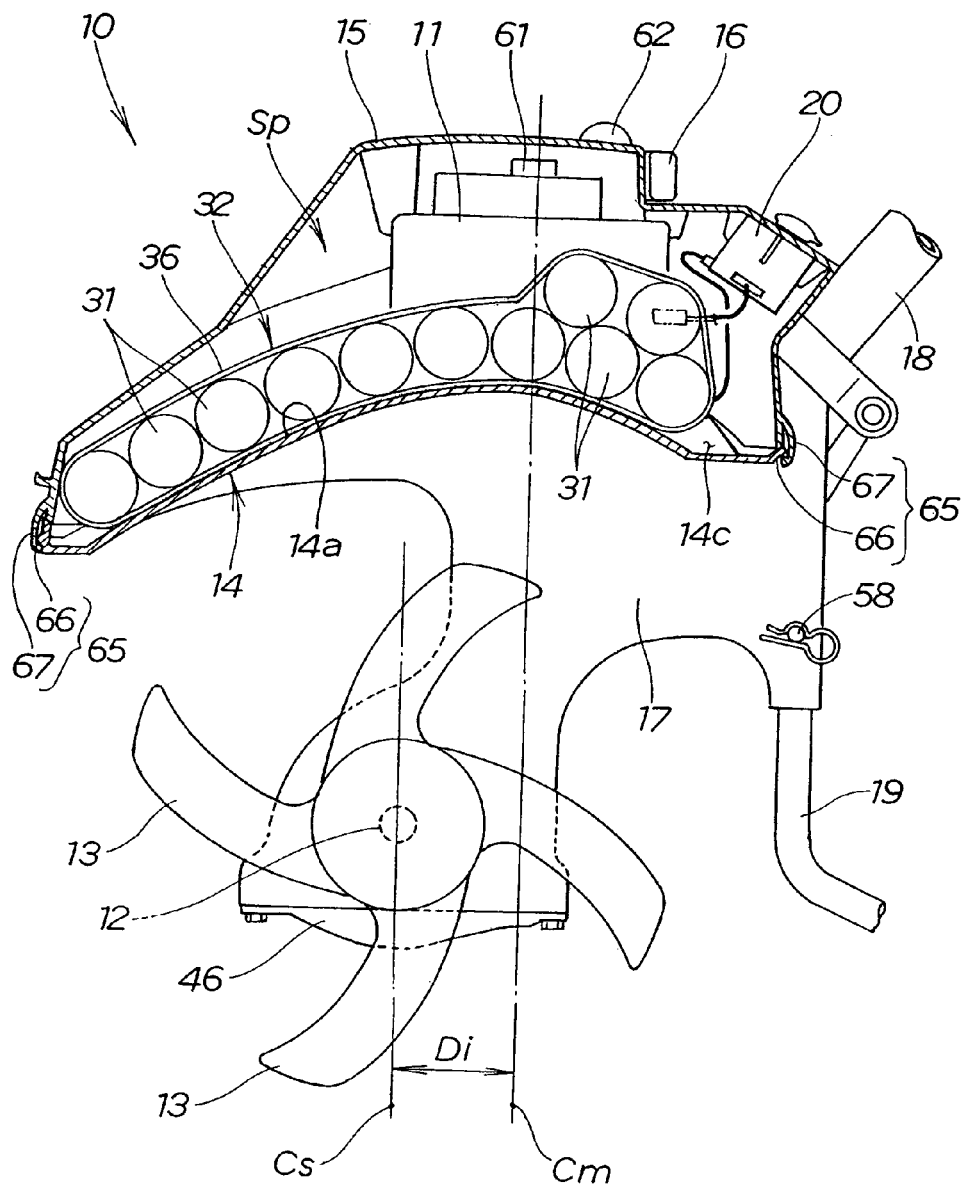
FIG. 8 is a sectional view taken along the 8—8 line of FIG. 4.

As illustrated in FIG. 8, the first battery row 32 has nine batteries 31 disposed side by side in the front-and-rear direction of the machine body, and two additional batteries 31 laid on the three rear-end batteries 31; that is, the first battery row 32 has a total of eleven batteries 31. Mechanism 65 for securing the upper cover 15 to the fender 14 is of a snap-fit type which includes a locking projection 66 of the fender 14 and an engaging portion 67 of the upper cover 15 engageable with the locking projection 66.

FIGS. 9, 10A–10C and 11A–11C show the left and right grip members 70 and 80 of the operating handle section 18 employed in the cultivating machine of the invention.

Figure 9:
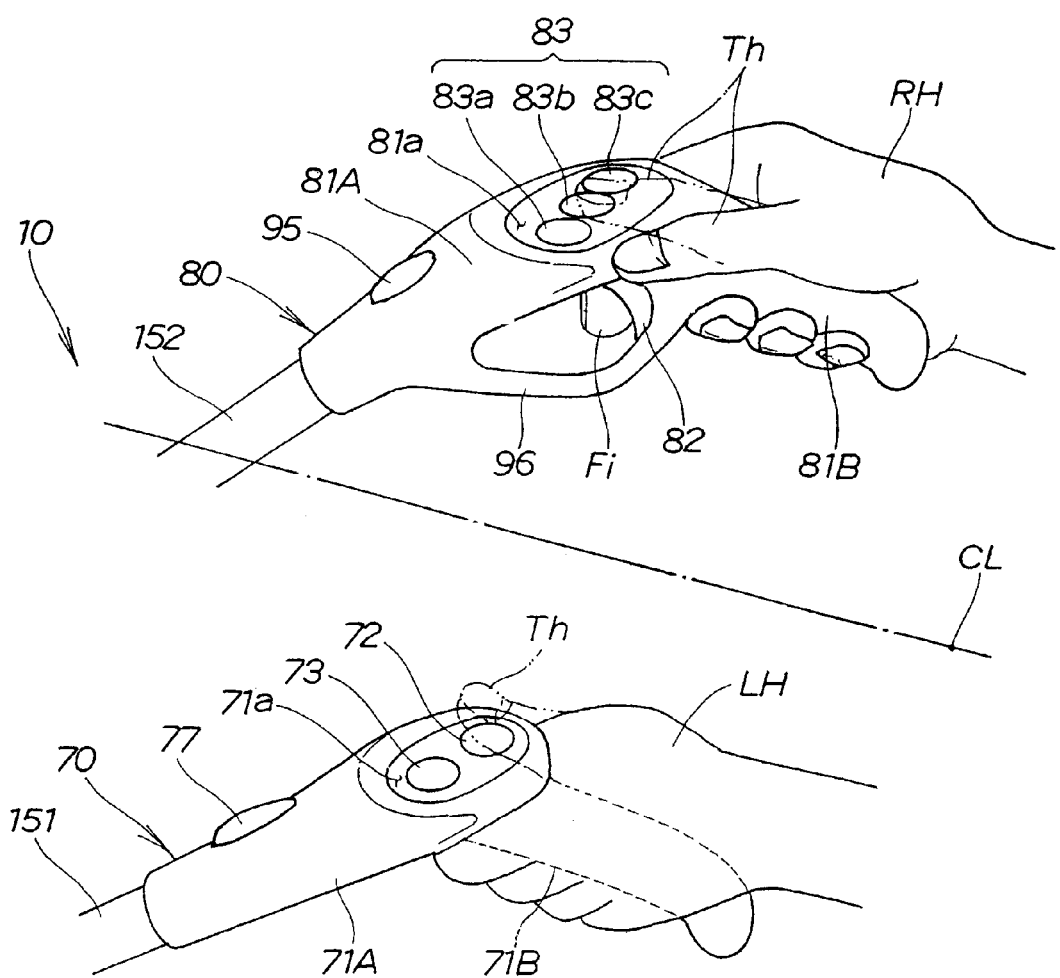
FIG. 9 is a perspective view of left and right grip members shown in FIG. 1.

As illustrated in FIG. 9, the left grip member 70 is integrally formed of resin, which includes a base section 71A provided on a distal end portion of the left handle portion 151 and a grip section 71B extending rearwardly from the rear end of the base section 71A.

On the base section 71A, there are provided a work starting operation button 72 and a main operation button 73. The work starting operation button 72 is a push button for activating and deactivating (starting and stopping rotation of) the motor 11 (FIG. 6), and the main operation button 73 is a push button for powering on and powering off the machine 10. Normally, these operation buttons 72 and 73 are operated with the thumb Th of the left hand LH grasping the grip section 71B.

The work starting operation button 72 is disposed on an upper surface portion 71a of the base section 71A close to the longitudinal centerline CL of the machine body, i.e. on an inner region of the upper surface portion 71a. The main operation button 73 is disposed to the left of the work starting operation button 72 on the upper surface portion 71a, i.e. on an outer region of the upper surface portion 71a.

Namely, in the instant embodiment, the work starting operation button 72 having a higher frequency of use during the work is positioned on the inner region close to the longitudinal centerline CL of the machine body, while the main operation button 73 having a lower frequency of use during the work is positioned on the outer region close to the left end of the upper surface portion 71a and remote from the longitudinal centerline CL.

Because these operation buttons 72 and 73 are operated using the thumb Th of the left hand LH gripping the grip section 71B, the work starting operation button 72 positioned close to the longitudinal centerline CL of the machine body is easier to depress than the main operation button 73 positioned remote from the centerline CL. With such arrangements, operability of the work starting operation button 72 having a higher frequency of use during the work can be enhanced, so that burdens on the human operator can be reduced. Because operability of the main operation button 73 having a lower frequency of use during the work is made somewhat lower than that of the work starting operation button 72 in this way, the main operation button 73 can be prevented from being erroneously operated against intention of the human operator. Namely, in the instant embodiment, the positional arrangement of the operation buttons 72 and 73 has been chosen with ergonomic considerations taken into account.

The right grip member 80 is integrally formed of resin, which includes a base section 81A provided on a distal end portion of the right handle portion 152 and a grip section 81B extending rearwardly from the rear end of the base section 81A. The right grip member 80 has a trigger-like work preparing lever 82 provided on the underside of the grip section 81B at a position where the lever 82 can be pulled with the pointing finger Fi of the right hand RH gripping the grip section 81B.

On the base section 81A, there are provided a plurality of (e.g., three) speed changing operation buttons 83, which constitutes a speed adjusting operating section for switching the rotation speed of the motor 11 between a plurality of different levels, such as low, medium and high speed levels. Typically, the speed adjusting operation section 83 is operated with the thumb Th of the right hand LH gripping the grip section 81B while pulling the work preparing lever 82.

The three speed changing operation buttons 83, which are a low speed button 83a, medium speed button 83b and high speed button 83c, are arranged in a horizontal row from a position close to the machine body centerline CL toward the right end of the base section 81A. If the low speed button 83a is depressed, the motor 11 is rotated at a low speed, if the medium speed button 83b is depressed, the motor 11 is rotated at a medium speed, and if the high speed button 83c is depressed, the motor 11 is rotated at a high speed.

Figure 10A:
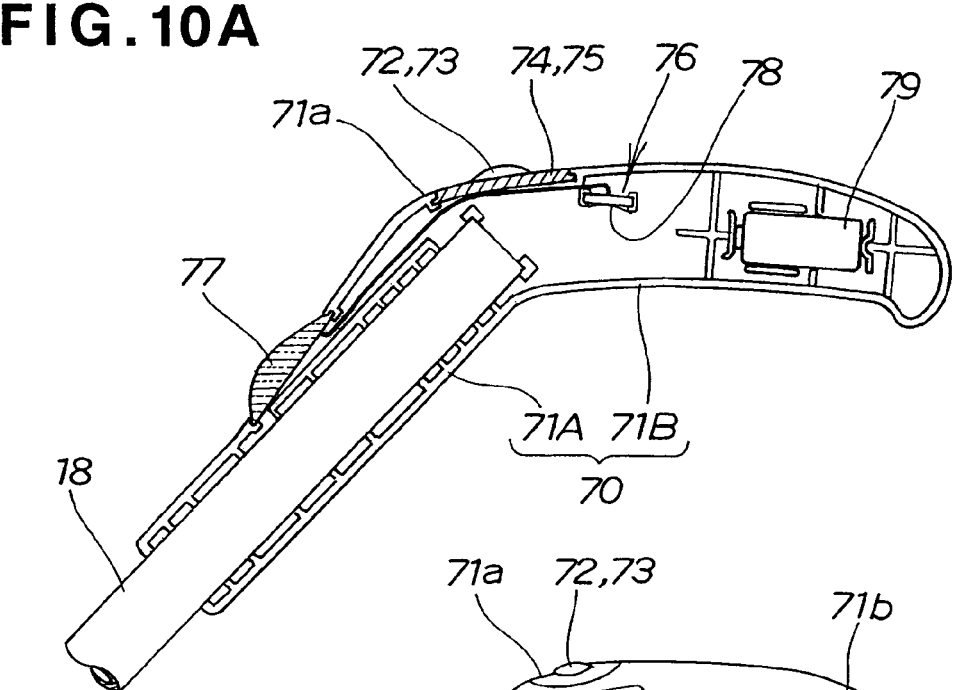
FIGS. 10A, 10B and 10C are views of the left grip member shown in FIG. 9.
Figure 10B:
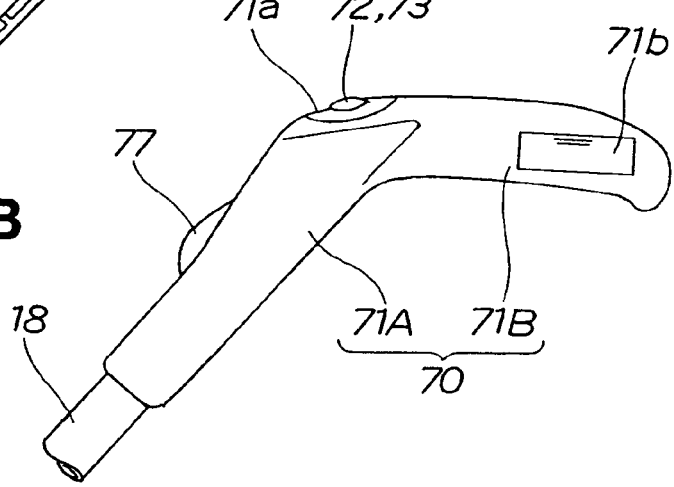
Figure 10C:
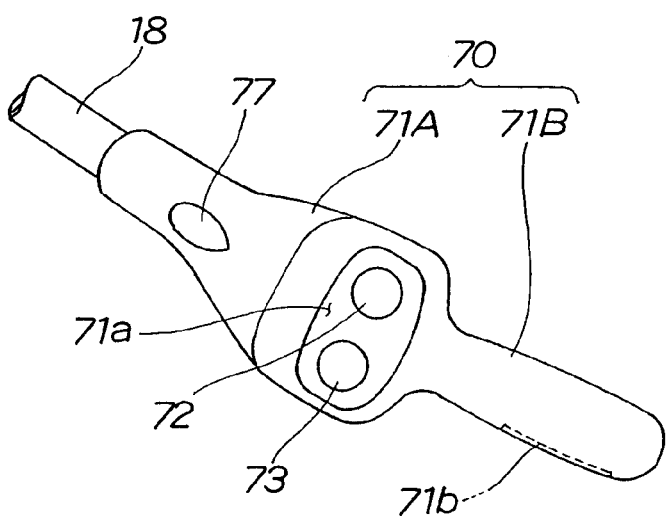

FIGS. 10A, 10B and 10C show more details of the left grip member 70 illustrated in FIG. 9.

The left grip member 70 is provided with a work starting switch (motor switch) 74 for turning on or off the motor 11 in response to operation of the work starting operation button 72, main switch 75 powering on or off the cultivating machine 10 in response to operation of the main operation button 73, and an encoder 76 for encoding each of switch signals generated by the switches 74 and 75. These switches 74 and 75 and encoder 76 are mounted on an upper front portion of the grip section 71B. Encoded signal output from the encoder 76 is transmitted as a radio signal via a left transmitter 77 that is provided on a front portion of the base section 71A.

The encoder 76 is mounted on a substrate 78 and powered by an encoder battery 79. The grip section 71B has a snap-fit lid 71b on its side surface, and the lid 71b can be opened and closed when the encoder battery 79 is to be replaced. Namely, by opening the lid 71b, the encoder battery 79 can be replaced through a not-shown opening.

Figure 11A:
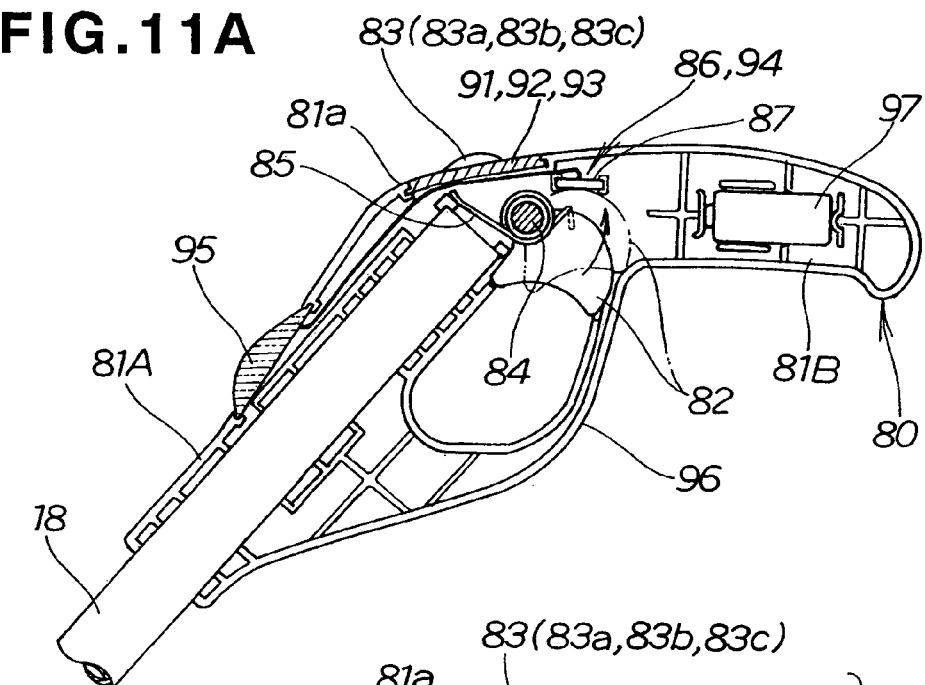
FIGS. 11A, 11B and 11C are views of the right grip member shown in FIG. 9.
Figure 11B:
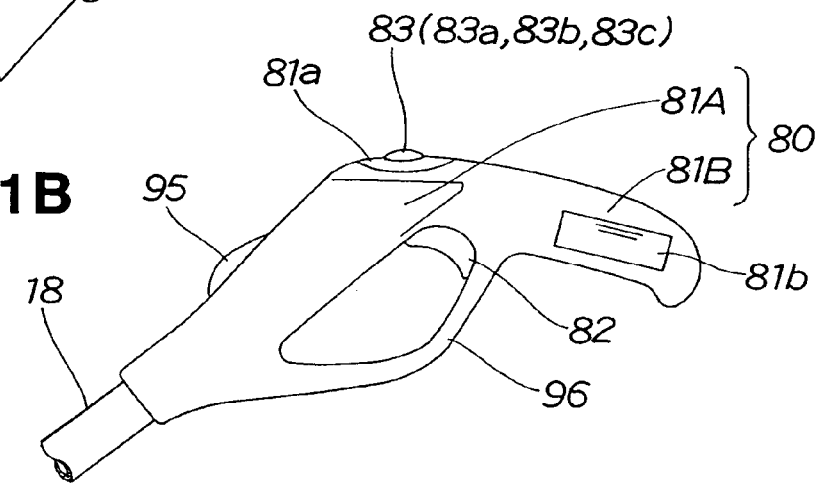
Figure 11C:
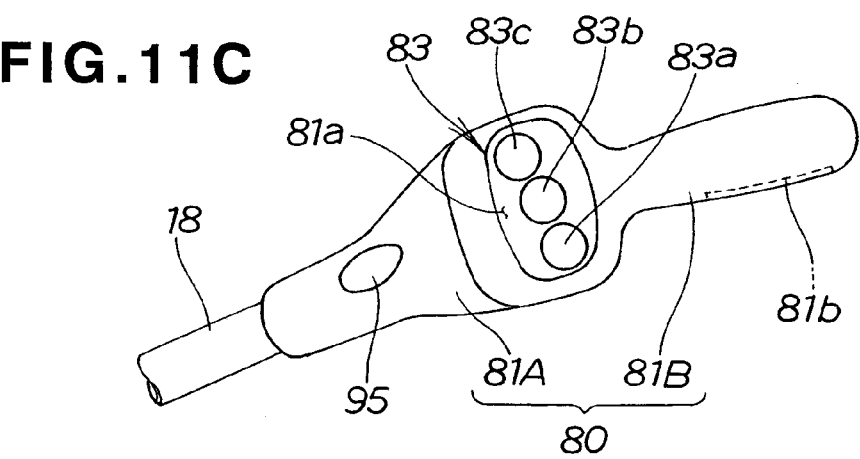

FIGS. 11A, 11B and 11C show more details of the right grip member 80 illustrated in FIG. 9.

The right grip member 80 has, in addition to the trigger-like work preparing lever 82 mounted for pivotal movement in the front-and-rear direction about a pin 84, a return spring 85 normally urging the work preparing lever 82 to an OFF position depicted by solid line in FIG. 11A, and a work preparing switch 86 turned on or off in response to operation of the work preparing lever 82.

The work preparing switch 86 is an automatically-resettable push button switch mounted on a substrate 87, which is kept ON only while the work preparing lever 82 is held, by being pivoted by the human operator, in the ON position depicted by imaginary line in FIG. 11A and is turned off once the human operator releases the work preparing lever 82. The work preparing switch 86 is a well-known trigger switch that is brought into or out of an open-contact position in response to operation of the work preparing lever 82.

The right grip member 80 has a low speed switch 91 that is turned on or off in response to operation of the low speed button 83a, a medium speed switch 92 that is turned on or off in response to operation of the medium speed button 83b, a high speed switch 93 that is turned on or off in response to operation of the high speed button 83c, and an encoder 94 for encoding each of signals from the switches 91–93 and work preparing switch 86. These switches 91–93 and encoder 94 are mounted on an upper front portion of the grip section 81B. Encoded signal output from the encoder 94 is transmitted as a radio signal via a right transmitter 95 that is provided on a front portion of the base section 81A. The encoder 94 is mounted on the substrate 87.

The low, medium and high speed switches 91–93 are each in the form a conventional automatically-resettable type push button switch, which is kept ON only while the human operator depresses the corresponding button 83a–83c, and turned off once the human operator releases the button.

In the instant embodiment, the trigger-like work preparing lever 82 is mounted on a lower front portion of the grip section 81B for pivotal movement in the front-and-rear direction, and a lever guard 96 surrounding the preparing lever 82 is formed integrally on the right grip member 80. Therefore, it is possible to prevent the work preparing lever 82 from being pivoted against intention of the human operator, for example, by some other object or person hitting the lever 82.

The encoder 94 is powered by an encoder battery 97. The grip section 81B has a snap-fit lid 81b on its side surface, and the lid 81b can be opened and closed when the encoder battery 97 is to be replaced. Namely, by opening the lid 81b, the encoder battery 97 can be replaced through a not-shown opening.

The receiver 62 of FIG. 1 receives each of the radio signals output from the transmitters 77 and 95 of FIG. 9.

Figure 12:
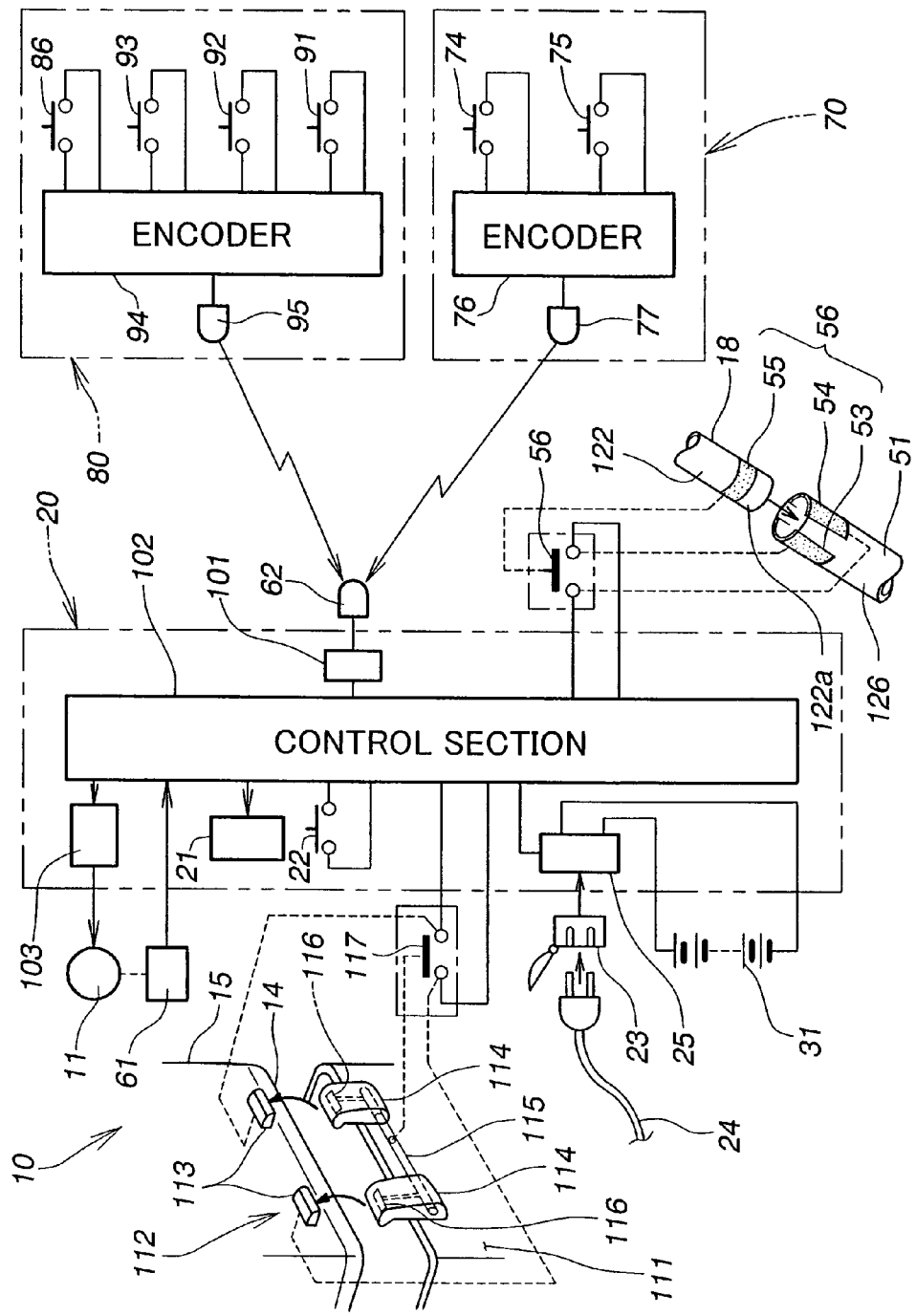
FIG. 12 is an electric block diagram of the walk-behind electric working machine of the invention.

FIG. 12 is a diagram showing electric functions of the walk-behind electric cultivating machine 10.

The left grip member 70 is provided with the work starting switch 74, main switch 75, encoder 76 and transmitter 77. The right grip member 80 is provided with the work preparing switch 86, low speed switch 91, medium speed switch 92, high speed switch 93, encoder 94 and transmitter 95.

The control box 20 includes a decoder 101 for decoding each radio signal received via the receiver 62, control section 102 and motor drive circuit 103.

Operation signal output from each of the switches of the left and right grip members 70 and 80 is encoded via the corresponding encoder 76, 94, and the resultant encoded signal is transmitted as a radio signal by the corresponding transmitter 77, 95. The radio signal from the transmitter 77, 95 is received via the receiver 62 and then decoded by the decoder 101, and the resultant decoded signal is supplied to the control section 102.

Here, the "radio signal" is a signal that can be transmitted from the transmitter 77, 95 to the receiver 62 via wireless communication; for example, the radio signal may be an infrared signal or electromagnetic wave signal. In the case where an infrared signal is used as the radio signal, the transmitters 77 and 95 may comprise light emitting elements, and the receiver 62 may comprise a light receiving element.

The control box 20 also includes the display section 21, cleaning switch 22 and charging socket 23.

The display section 21 displays operating states of the cultivating machine 10, a remaining amount of electric power and charged state of the batteries 31, a state of cleaning by the cleaning box 111, etc.

The cleaning switch 22 of the control box 20 is operable to start or stop the rotation of the motor 11 when a cleaning operation by the cleaning box 111 is to be started or stopped. Specifically, the cleaning switch 22 is in the form of a push button switch of the well-known automatically-resettable type, which is kept ON only while the human operator depresses the switch and is turned off once the human operator releases the switch.

The charging socket 23 is a connector for connection with an external charging cord 24 to charge the batteries 31 via a charger 25.

The control section 102 is supplied with signals from the cleaning switch 22, battery charger 25, handle attachment switch 56, rotation sensor 61, cleaning box attachment box 117 and decoder 101, in accordance with which it controls the display section 21 and the rotation of the motor 11 via the motor drive circuit 103.

When the machine-body-side terminals 53 and 54 are electrically interconnected via the handle-side terminal 55 by the human operator inserting the proximal end portion 122a of the handle post 122 into the handle support section 51, the control section 102 controls the motor 11 to rotate in response to operation, by the human operator, of the operating buttons 72, 73, 83 and operation preparing lever 82 on the handle 124 (see FIG. 3).

In addition, when the machine-body-side terminals 53 and 54 are electrically disconnected from each other by the human operator pulling the proximal end portion 122a of the handle post 122 out of the handle support section 51, the control section 102 controls the motor 11 to not rotate despite operation, by the human operator, of the operating buttons 72, 73, 83 and operation preparing lever 82 on the handle 124. Namely, with the proximal end portion 122a of the handle post 122 removed from the handle support section 51, the motor 11 can be prevent from being driven when the operating buttons 72, 73, 83 have been operated.

The cultivating machine 10 can be removably attached to the cleaning box 111 as follows. The fender 14 is placed on the cleaning box 111 and then attached to the box 111 via a fastening mechanism 112. The fastening mechanism 112 is of a snap-fit structure, which includes a pair of locking projections 113 provided on the fender 14 and a pair of engaging sections 114 provided via a conductive hinge pin 115 on the cleaning box 111 and engageable with the locking projections 113.

The locking projections 113 function as electrically-conductive fixed electrodes, and the engaging sections 114 have movable electrodes 116 electrically interconnected via the hinge pin 115. The locking projections fixed electrodes) 113, movable electrodes 116 and hinge pin 115 together constitute the above-mentioned cleaning box attachment box 117. By bringing the engaging sections 114 into engagement with the locking projections 113, the locking projections 113 are electrically interconnected via the movable electrodes 116 and hinge pin 115.

Now, a description will be given about behavior of the control section 102, with reference to flow charts of FIGS. 12 and 13.

Step ST01: Necessary initialization is executed. For example, a current target rotation speed SO of the motor 11 is set at a "low speed" Ln that is equal in value to the rotation speed set via the low speed switch 91.

Step ST02: Determination is made as to whether the operating handle section 18 has been set in the handle support section 51. With an affirmative or YES determination, control proceeds to step ST03, while, with a negative or NO determination, control proceeds to step ST12. If the handle attachment switch 56 is ON, then it is determined that the operating handle section 18 has been set in the handle support section 51.

Step ST03: Determination is made as to whether the main switch 75 is ON). With a YES determination, control proceeds to step ST04, while, with a NO determination, control proceeds to step ST10.

Step ST04: Determination is made as to whether the work preparing switch 86 is ON. With a YES determination, control proceeds to step ST05, while, with a NO determination, control proceeds to step ST10.

Step ST05: Determination is made as to whether the work starting switch (motor switch) 74 is ON. With a YES determination, control proceeds to step ST06, while, with a NO determination, control proceeds to step ST10.

Step ST06: If the four conditions have been satisfied at steps ST02, ST03, ST04 and ST05 above, i.e. if affirmative determinations have been made at all of steps ST02, ST03, ST04 and ST05, the electric motor 11 is activated or caused to rotate. Namely, the electric motor 11 is caused to rotate, only upon satisfaction of the first condition that the operating handle section 18 has been set in the handle support section 51, the second condition that the main operation button has been depressed (i.e., the main switch 75 has been depressed or turned on), the third condition that the work preparing lever has been shifted to a predetermined position (i.e., the work preparing switch 86 has been turned on) and the fourth condition that the work starting button has been depressed (i.e., the work starting switch 74 has been turned on).

Step ST07: The target motor rotation speed SO is read which is currently set by turning-on of the low speed switch 91, medium speed switch 92 or high speed switch 93. If the high speed switch 93 has been turned on, the motor rotation speed SO is set to the high speed Hn, if the medium speed switch 92 has been turned on, the motor rotation speed SO is set to the medium speed Mn, and if the low speed switch 91 has been turned on, the motor rotation speed SO is set to the low speed Ln. When no rotation speed is designated by any one of the switches 91–93, the motor rotation speed SO is set as default at the low speed Ln.

Step ST08: Actual rotation speed SN of the motor 11 is calculated or determined, for example, on the basis of an output of the rotation sensor 61 measuring an actual number of rotations of the motor 11.

Step ST09: Control reverts to step ST02 after controlling the motor 11 in accordance with the currently-set target motor rotation speed SO. Namely, at this step, the motor 11 is controlled such that the actual rotation speed SN equals the currently-set target motor rotation speed SO. The target motor rotation speed SO is provided as a PI (Proportional and Integral) control signal in the case of the PI control, but as a PID (Proportional, Integral and Differential) control signal in the case of the PID control. Alternatively, such a control signal may be a PWM (Pulse Width Modulation) signal.

Step ST10: The motor 11 is deactivated upon satisfaction of any one of a first condition that the main operation button has been depressed again (the main switch 75 has been turned off), a second condition that the work preparing lever has been released (i.e., the work preparing switch 86 has been turned off and a third condition that the work starting operation button has been depressed again (i.e., the work starting switch 74 has been turned off).

Step ST11: Control reverts to step ST02 after setting the target motor rotation speed SO to the low speed Ln, namely, back to the initial setting.

Step ST12: Determination is made as to whether the cleaning box 111 has been appropriately attached to the fender 14. With a YES determination, control proceeds to step ST13, while, with a NO determination, control proceeds to step ST18. If the cleaning box attachment box 117 is in the ON state, it is determined that the cleaning box 111 has been appropriately attached to the fender 14.

Step ST13: Determination is made as to whether the cleaning switch 22 is ON. With a YES determination, control proceeds to step ST14, while, with a NO determination, control proceeds to step ST18.

Step ST14: If the three conditions have been satisfied at steps ST02, ST12 and ST13 above, the electric motor 11 is activated or caused to rotate. Namely, the electric motor 11 is caused to rotate, only upon satisfaction of the first condition that the operating handle section 18 has been taken out of the handle support section 51, the second condition that the cleaning box 111 has been appropriately attached to the fender 14 and the third condition that the cleaning switch 22 has been turned on.

Step ST15: The target motor rotation speed SO is set to a cleaning rotation speed Wn that corresponds to a given number of rotations of the motor 11 suitable for cleaning or washing the cultivating claws within the cleaning box 111.

Step ST16: Actual rotation speed SN of the motor 11 is calculated or determined, for example, on the basis of an output of the rotation sensor 61 measuring an actual number of rotations of the motor 11.

Step ST17: Control reverts to step ST02 after controlling the motor 11 in accordance with the currently-set target motor rotation speed SO. Namely, at this step, the motor 11 is controlled such that the actual rotation speed SN equals the currently-set target motor rotation speed SO. The target motor rotation speed SO is provided as a PI (Proportional and Integral) control signal in the case of the PI control, but as a PID (Proportional, Integral and Differential) control signal in the case of the PID control. Alternatively, such a control signal may be a PWM (Pulse Width Modulation) signal.

Step ST18: The motor 11 is deactivated upon satisfaction of any one of a first condition that the cleaning box 111 has been detached from the fender 14 and a second condition that the cleaning switch 22 has been turned off.

Step ST19: Control reverts to step ST02 after setting the target motor rotation speed SO to the low speed Ln, namely, back to the initial setting.

The following paragraphs describe the operating handle section 18 with reference to FIGS. 14–17.

Figure 14:
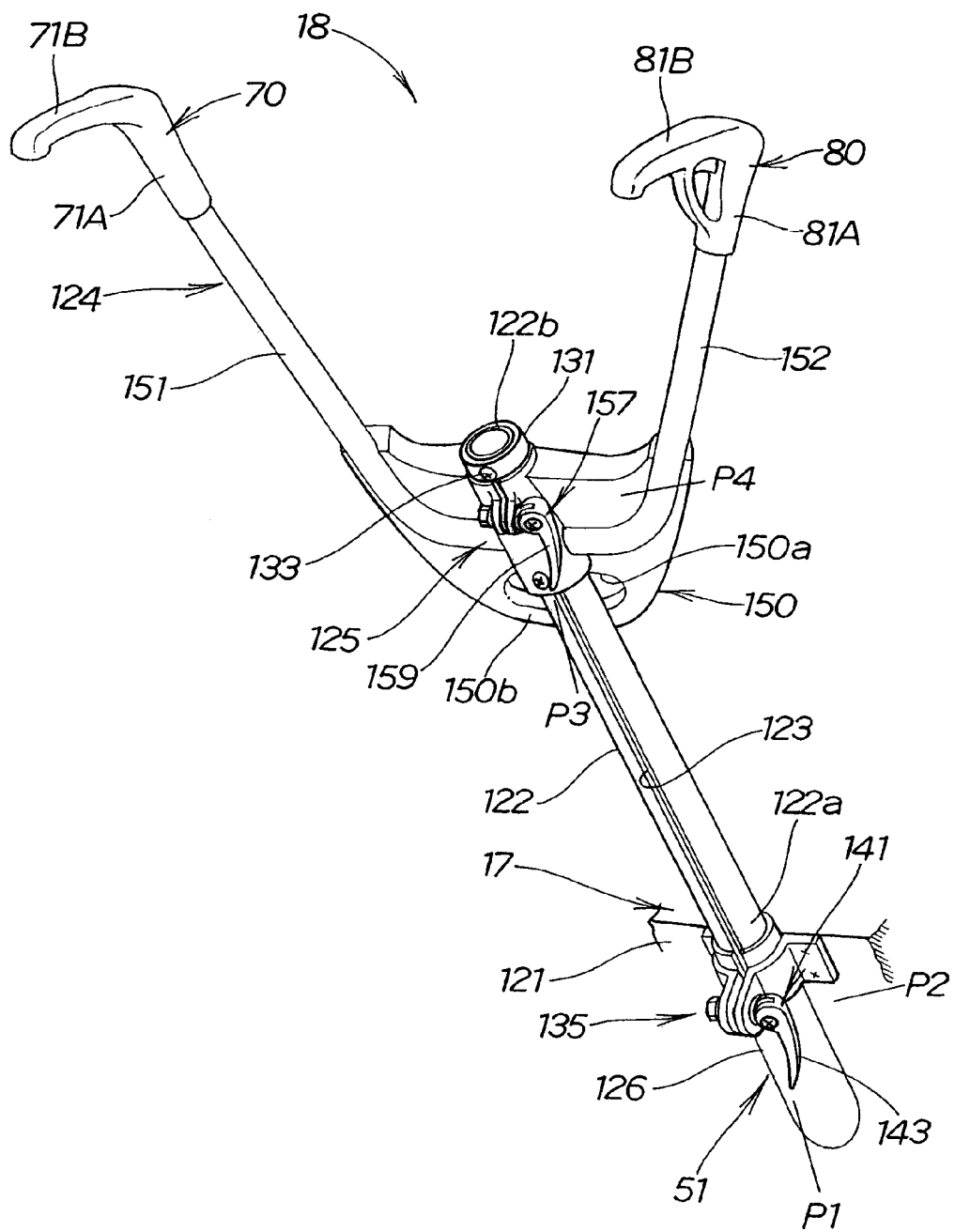
FIG. 14 is a rear perspective view of an operating handle mounted in a handle support section.
Figure 15:
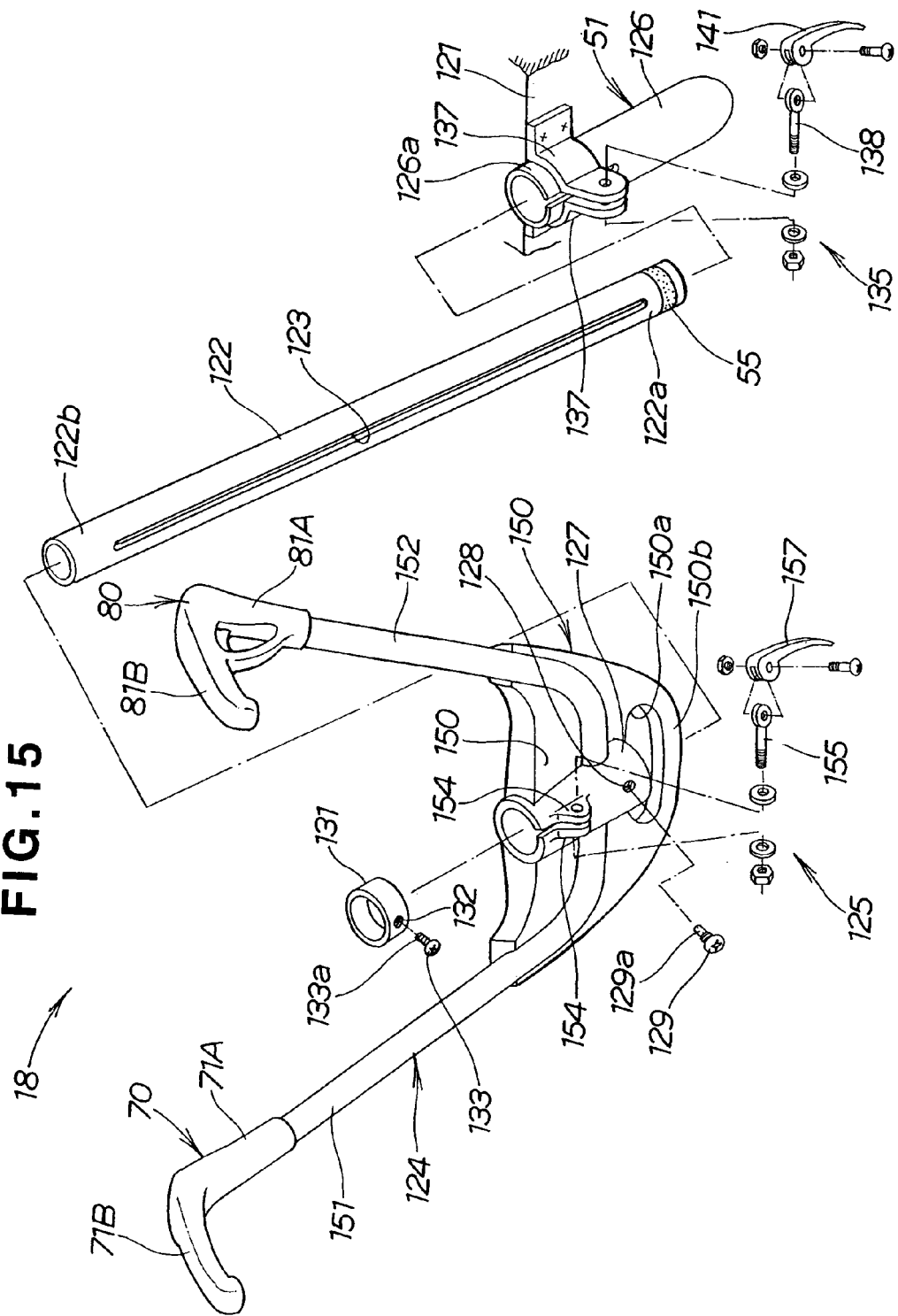
FIG. 15 is an exploded perspective view of the handle shown in FIG. 14.

Referring first to FIGS. 14 and 15, the handle support section 51 for supporting the operating handle section 18 is provided on a rear body frame portion 121; specifically, the handle support section 51 removably supports therein the proximal end portion 122a of the handle post 122 of the handle section 18. The bifurcated handle 124 is mounted in the handle post 122 for sliding movement between the proximal end portion 122a and distal end portion 122b of the post 122. Handle locking mechanism 125 for locking the handle 124 is provided in a predetermined position of the handle post 122.

To attach the handle 124 to the handle post 122, a cylindrical portion 127 of the handle 124 is first fitted into the distal end portion 122b of the post 122, as shown in FIG. 15. Then, a bolt 129 is screwed through a threaded hole 128 of the cylindrical portion 127 until a distal end portion 129a of the bolt 129 is received in a guide groove 123 formed along the length of the handle post 122. After that, a stopper ring 131 is fitted around the distal end portion 122b of the post 122, and then a locking bolt 133 is screwed into a threaded hole 132 of the stopper ring 131. Then, the stopper ring 131 is fixed by pressing the distal end 133a of the locking bolt 133 against the outer peripheral surface of the distal end portion 122b of the post 122.

Figure 16:
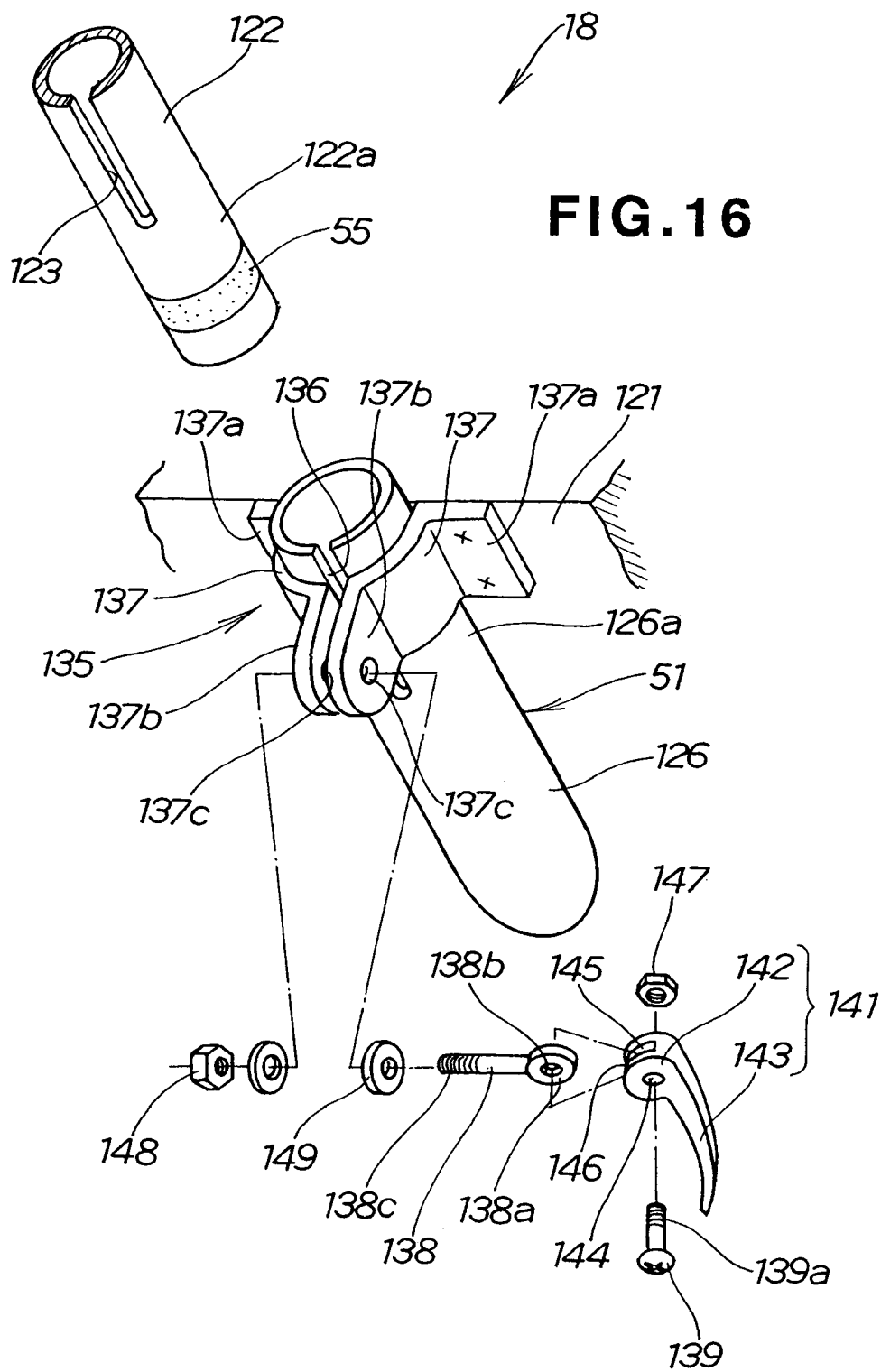
FIG. 16 is an exploded perspective view of a handle post locking mechanism shown in FIG. 14.

As illustrated in FIG. 16, the handle support section 51 is mounted to the rear body frame portion 121 by securing an upper end portion 126a of the supporting pipe 126 to the rear frame portion 121 via a handle post locking mechanism 135.

The handle post locking mechanism 135 has a slit 136 formed in the upper end portion 126a of the pipe 126, a pair of fastening brackets 137 disposed on the outer periphery of the upper end portion 126a and having respective base portions secured to the rear body frame portion 121, a fastening bolt 138, and a locking lever 141 mounted via a mounting bolt 139 on a head portion 138a of the fastening bolt 138. The fastening brackets 137 have left and right projecting portions 137b opposed to each other with a predetermined distance therebetween at a position corresponding to the slit 136, and the fastening bolt 138 is inserted through holes 137c formed in the respective projecting portions 137b.

The locking lever 141 has a bifurcated cam portion 142 and a lever portion 143. The bifurcated cam portion 142 has a pair of opposed inner and outer mounting holes 144 (only one of the central mounting holes 144 is shown) formed substantially centrally therein, and a receiving groove 145 formed substantially centrally of its thickness and extending in a direction perpendicular to the holes 144, and an outer cam surface 146.

The head portion 138a of the fastening bolt 138 is inserted in the receiving groove 145, and the mounting bolt 139 is inserted through the central mounting holes 144 of the cam portion 142 and a mounting hole 138b of the head portion 138a. Nut 147 is screwed on a threaded portion 139a of the mounting bolt 139 that projects beyond the other inner mounting hole 144, and a nut 148 is screwed on a threaded portion 138c of the fastening bolt 138 that projects beyond the left projecting portion 137b. The right projecting portion 137b is pressed by the cam surface 146 via a washer 149, to thereby support the upper end portion 126a of the supporting pipe 126 via the opposed brackets 137.

The cam surface 146 is formed such that the projecting portions 137b are opposed to each other with a smaller distance when the lever portion 143 is in a locking position P1 (FIG. 14) while the projecting portions 137b are opposed to each other with a greater distance when the lever portion 143 is in an unlocking position P2 (FIG. 14).

The slit 136 in the supporting pipe 126 can be reduced in its width by holding the lever portion 143 in the locking position P1 to thereby reduce the distance between the projecting portions 137b. In this way, the inner diameter of the upper end portion 126a of the supporting pipe 126 is reduced so that the proximal end portion 122a of the handle post 122 inserted in the pipe 126 can be held tightly and thus locked by the pipe 126.

The slit 136 formed in the supporting pipe 126 can be increased in its width by shifting the lever portion 143 to the unlocking position P2 to thereby increase the distance between the opposed projecting portions 137b. Thus, the inner diameter of the upper end portion 126a of the supporting pipe 126 is increased so that the proximal end portion 122a of the handle post 122 inserted in the pipe 126 is loosened and thus unlocked by the pipe 126.

Figure 17:
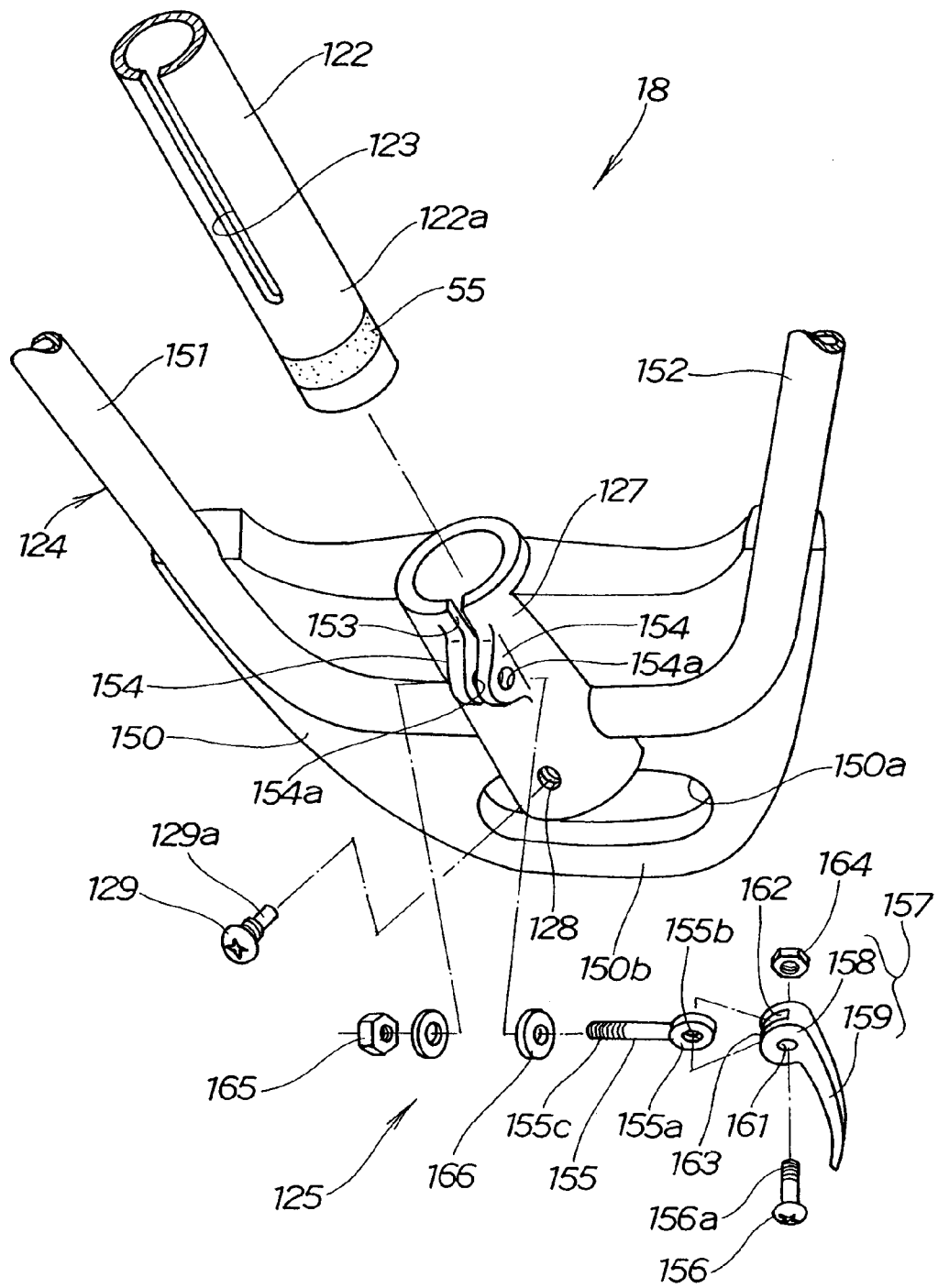
FIG. 17 is an exploded perspective view of a handle locking mechanism shown in FIG. 14.

FIG. 17 shows the locking mechanism for locking the handle 124 to the handle post 122.

The handle 124 includes the cylindrical body 127, left and right handle portions 151 and 152 joined to a lower end portion of the cylindrical body 127, and the handle locking mechanism 125 provided on an upper end portion of the cylindrical body 127. The cylindrical body 127 has the threaded hole 128 formed in its lower end portion for screwing therein of the bolt 129. Ornamental bracket 150 is formed on base portions of the handle portions 151 and 152 and an upper portion of the cylindrical body 127.

The cylindrical body 127 of the handle 124 has a slit 153 formed in its upper end portion, and a pair of projecting portions 154 formed adjacent to the opposed longitudinal edges of the slit 153 so as to be oppose to each other with a predetermined distance therebetween. Each of the projecting portions 154 has a through-hole 154a for insertion therethrough a fastening bolt 155. Locking lever 157 is secured to a head portion 155a of the fastening bolt 155 via a mounting bolt 156.

The locking lever 157 has a cam portion 158 and a lever portion 159. The cam portion 158 has a pair of opposed inner and outer mounting holes 161 (only one of the central mounting holes 161 is shown) formed substantially centrally therein, and a receiving groove 162 formed substantially centrally of its thickness and extending in a direction perpendicular to the holes 161, and an outer cam surface 163.

The head portion 155a of the fastening bolt 155 is inserted in the receiving groove 162, and the mounting bolt 156 is inserted through the central mounting holes 161 of the cam portion 158 and a mounting hole 155b of the head portion 155a. Nut 164 is screwed on a threaded portion 156a of the mounting bolt 156 that projects beyond the other inner mounting hole 161, and a nut 165 is screwed on a threaded portion 155c of the fastening bolt 155 that projects beyond the left projecting portion 154. The right projecting portion 154 is pressed by the cam surface 163 via a washer 166.

The cam surface 163 is formed such that the projecting portions 154 are opposed to each other with a smaller distance when the lever portion 159 is in a locking position P3 (FIG. 14) while the projecting portions 154 are opposed to each other with a greater distance when the lever portion 159 is in an unlocking position P4 (FIG. 14).

The slit 153 formed in the cylindrical body 127 can be reduced in its width by holding the lever portion 159 in the locking position P3 to thereby reduce the distance between the projecting portions 154. In this way, the inner diameter of the cylindrical body 127 is reduced so that the handle post 122 in the cylindrical body 127 can be held tightly and thus locked by the cylindrical body 127.

The slit 153 in the cylindrical body 127 can be increased in its width by shifting the lever portion 159 to the unlocking position P4 to thereby increase the distance between the projecting portions 154. Thus, the inner diameter of the cylindrical body 127 is increased so that the handle post 122 inserted in the cylindrical body 127 is loosened and thus unlocked by the cylindrical body 127, so that the handle 124 is movable between the proximal end portion 122a and distal end portion 122b of the handle post 122 (see FIG. 15).

The distal end portion 129a of the bolt 129, screwed into the threaded hole 128 of the cylindrical body 127, is inserted in the guide groove 123 for sliding movement therealong, so that the handle 124 can move along the length of the handle post 122 without rotating relative to the post 122.

The ornamental bracket 150 has an operating hole 150a in its lower end portion. The human operator can move the handle 124 between the proximal end portion 122a and distal end portion 122b of the post 122 (see FIG. 15), by holding a handle portion 150b while inserting one or more fingers in the operating hole 150a. With the operating hole 150a formed in the lower end portion of the ornamental bracket 150, the handle 124 can be easily caused to slide relative to the handle post 122, which can contribute to improved usability of the machine 10.

FIGS. 18A, 18B, 19, 20A, 20B, 21A, 22B and 22 are explanatory of how the handle 124 is locked and unlocked in the instant embodiment.

Figure 18A:
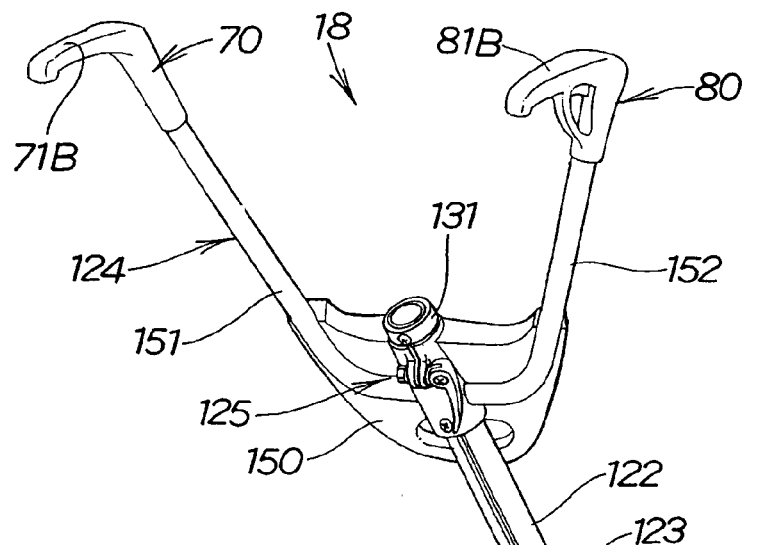
FIGS. 18A, 18B and 19 are views explanatory of how the handle post is pulled out of the handle support section by placing the handle post locking mechanism in an unlocking position.

As illustrated in FIG. 18A, the lever portion 143 of the locking mechanism 135 is caused to pivot about the bolt 139 from the locking position P1 to the unlocking position P2 as depicted by arrow (1).

Figure 18B:
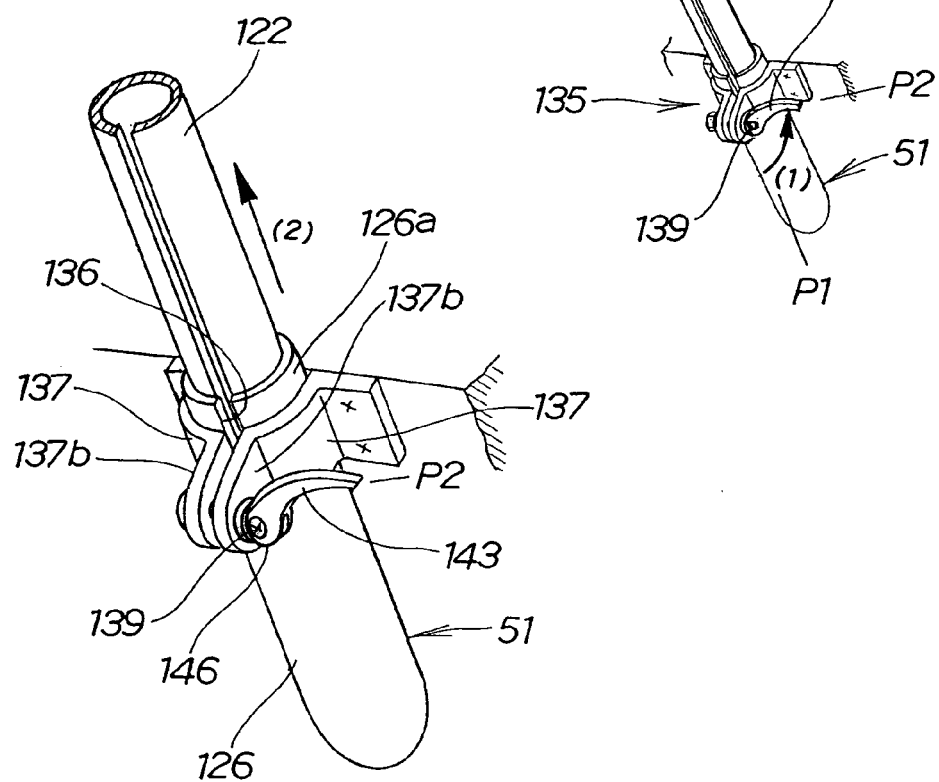

In FIG. 18B, the lever portion 143 is shifted to the unlocking position P2 to thereby increase the distance between the opposed projecting portions 137b and hence the width of the slit 136 in the supporting pipe 126. Thus, the inner diameter of the supporting pipe 126 is increased to weaken the fastening force applied to the handle post 122 by the supporting pipe 126, so that the handle post 122 is released from the locking by the pipe 126. Then, the handle post 122 is pulled out of the supporting pipe 126 as depicted by arrow (2).

Figure 19:
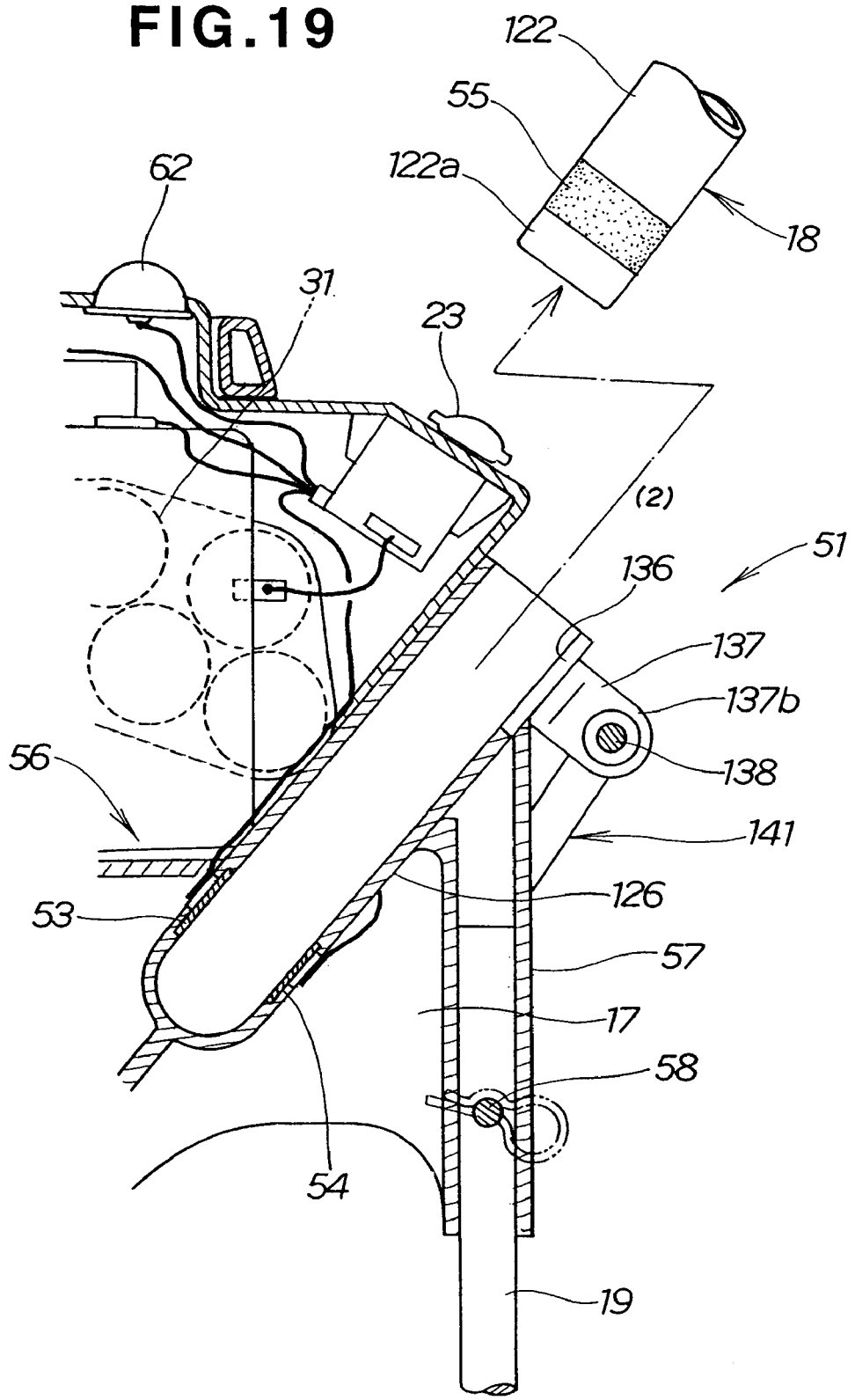

By pulling the proximal end portion 122a of the handle post 122 from the supporting pipe 126, as illustrated in FIG. 19, the handle-side terminal 55 of the proximal end portion 122a is disconnected from the machine-body-side terminals 53 and 54 within the supporting pipe 126. Namely, the handle attachment switch 56, composed of the handle-side terminal 55 and machine-body-side terminals 53 and 54, is brought to an electrically-disconnected or OFF state.

With the handle attachment switch 56 thus electrically disconnected, the control section 102 (see FIG. 12) can control the cultivating claws (working unit) 13 to not work even when the operating buttons 72, 73 and 83 and work preparing lever 82 have been operated. This arrangement can eliminate a need for the human operator to turn off the main switch each time the handle post 122 is detached from the supporting pipe 126.

Figure 20A:
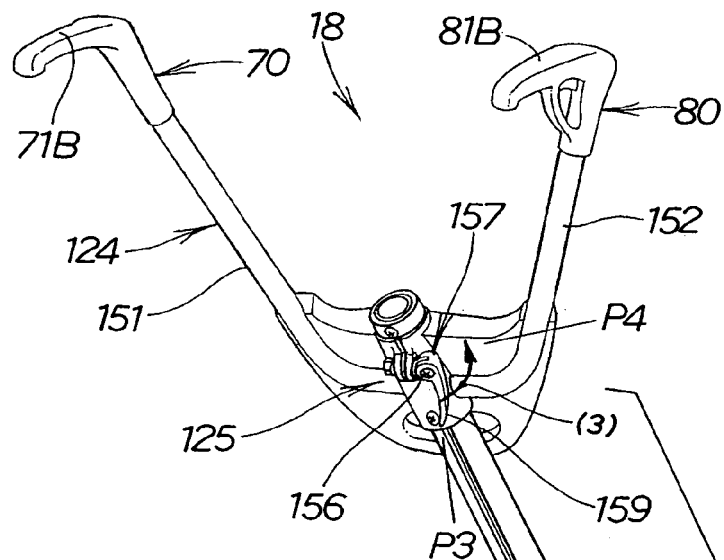
FIGS. 20A and 20B are views showing the handle released from locking by the handle post.

As illustrated in FIG. 20A, the lever portion 159 of the locking mechanism 125 is caused to pivot about the bolt 156 from the locking position P3 to the unlocking position P4 as depicted by arrow (3).

Figure 20B:
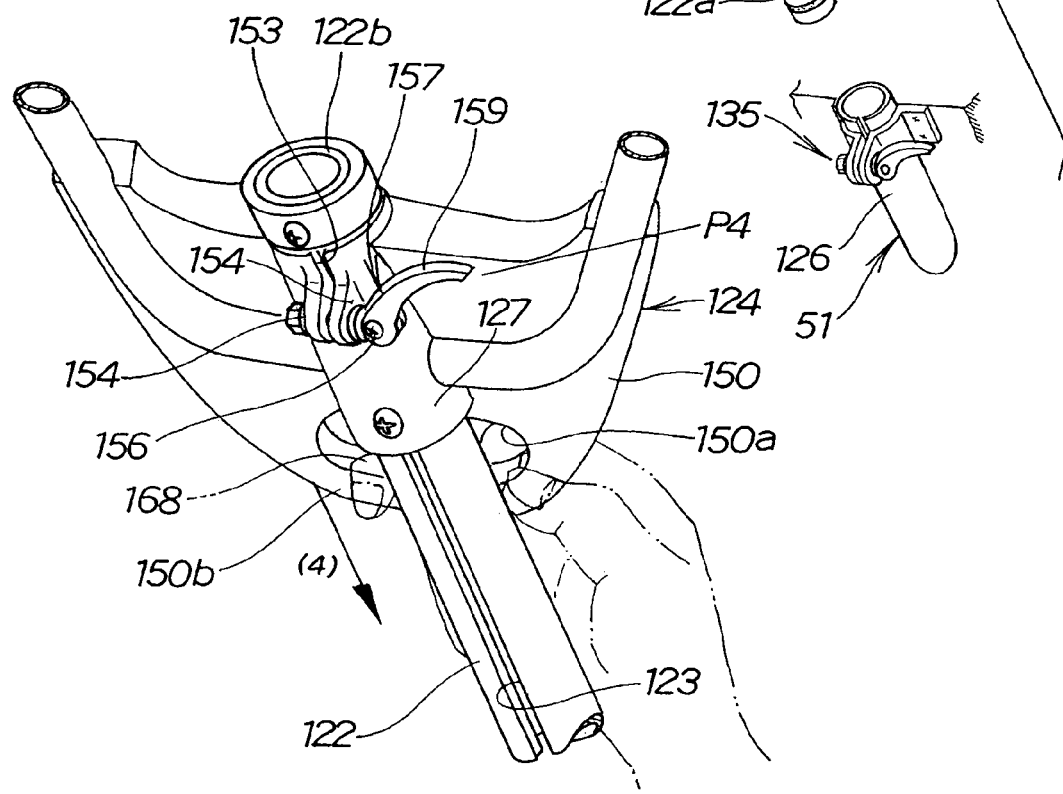

In FIG. 20B, the lever portion 159 is shifted to the unlocking position P4 to thereby increase the distance between the opposed projecting portions 154 and hence the width of the slit 153 in the cylindrical body 127. Thus, the inner diameter of the cylindrical body 127 is increased to weaken the fastening force applied to the handle post 122 by the cylindrical body 127, so that the handle 124 is now movable between the proximal end portion 122a and distal end portion 122b of the post 122 (see FIG. 20A).

In this state, the human operator can move the handle 124 toward the proximal end portion 122*a* of the post 122, as depicted by arrow (4), by inserting one or more fingers in the operating hole 150*a*.

After the handle 124 has been moved to the proximal end portion 122*a*, the lever portion 159 of the locking mechanism 125 is caused to pivot about the bolt 156 from the unlocking position P4 to the locking position P3 as depicted by arrow (5).

The slit 153 in the cylindrical body 127 can be reduced in its width by the human operator holding the lever portion 159 in the locking position P3 to thereby reduce the distance between the projecting portions 154. In this way, the inner diameter of the cylindrical body 127 is reduced so that the handle post 122 in the cylindrical body 127 can be held tightly and thus locked by the cylindrical body 127. Thus, the length of the handle section 18 can be reduced to about half the length in use (in-use length).

In this condition, an end surface 131*a* of the stopper ring 131 mounted on the distal end portion 122*b* of the handle post 122 (and the distal end portion 122*b*) lie in an imaginary plane 169 (depicted by imaginary line in FIG. 21A) defined by respective distal end portions 78 and 88 of the left and right grip sections 71B and 81B. The imaginary plane 169 extends in a direction perpendicular to the handle post 122.

After the handle 124 has been locked in the proximal end portion 122*a* of the handle post 122, the operating handle section 18 is inverted vertically as depicted by arrow (6) by the human operator gripping the handle 150*b* with a finger 168 inserted in the operating hole 150*a* (see FIG. 20B).

Figure 21A:
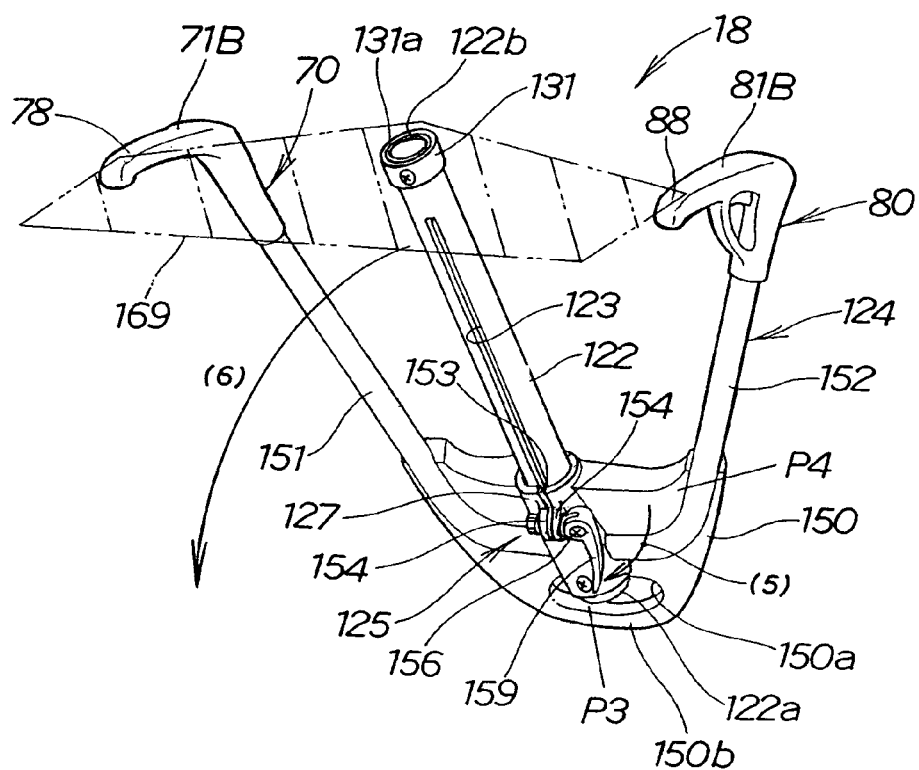
FIGS. 21A and 21B are views showing the handle released from the locking by the handle post and slid relative to the handle post.
Figure 21B:
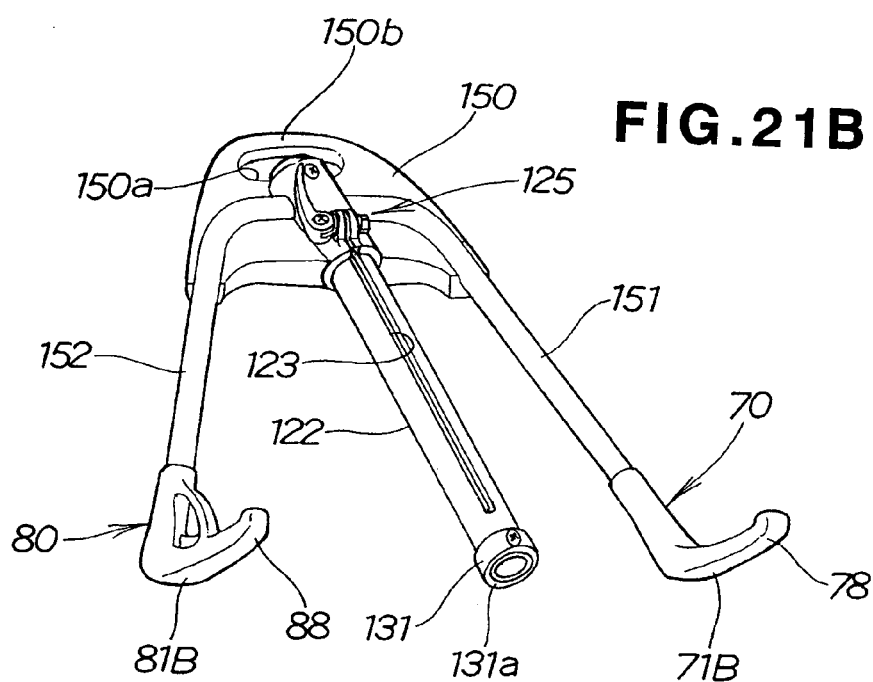

Then, as illustrated in FIG. 21B, the operating handle section 18 can be held in a collapsed size with the end surface 131*a* of the stopper ring 131 and respective distal end portions 78 and 88 of the left and right grip sections 71B and 81B placed on the ground surface or floor surface. In this case, the human operator can readily handle the operating handle section 18 by gripping the handle section 18 with his finger inserted in the operating hole 150*a*, so that the end surface 131*a* of the stopper ring 131 and respective distal end portions 78 and 88 of the left and right grip sections 71B and 81B can be placed on the ground surface or floor surface with ease.

Figure 22:
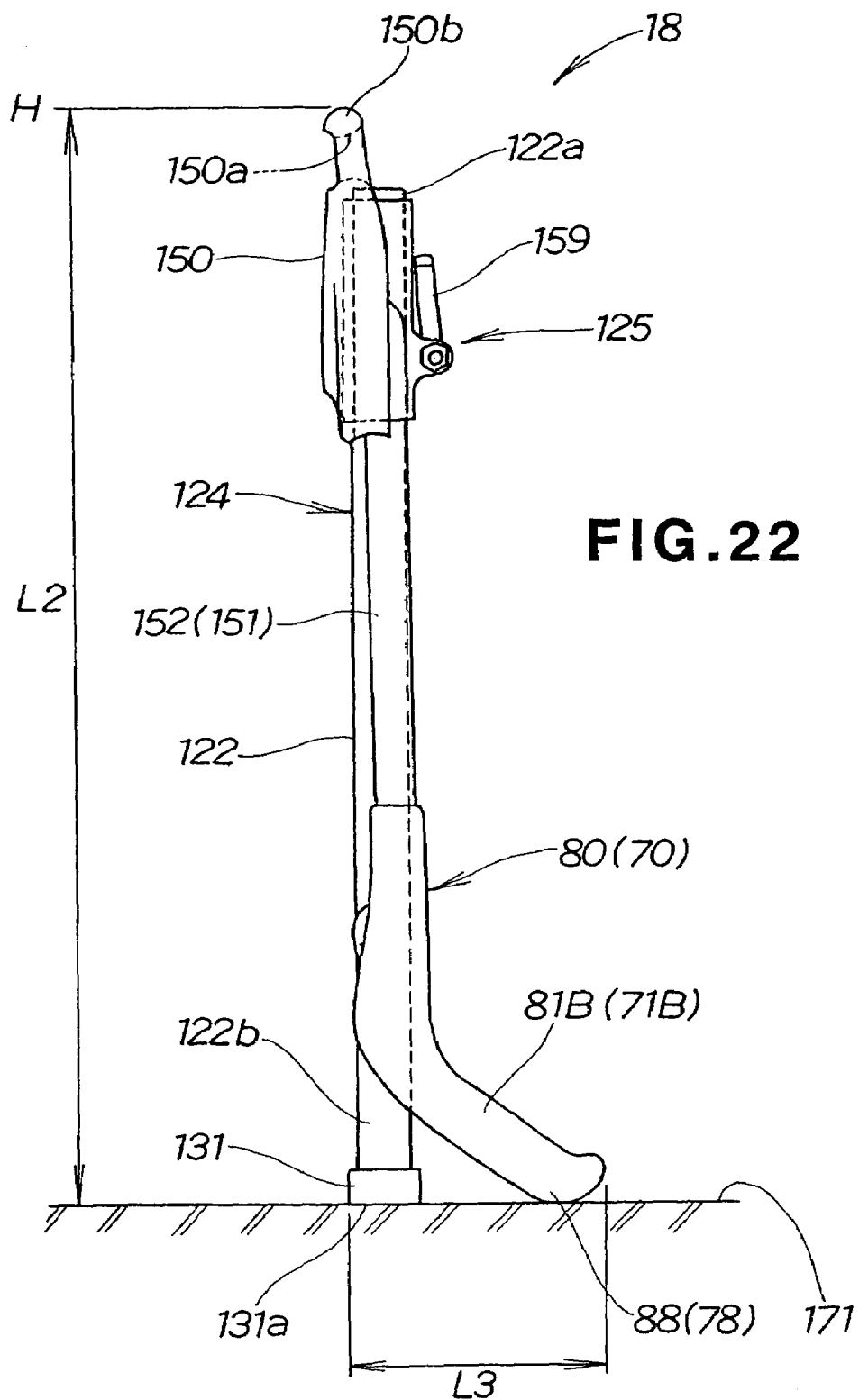
FIG. 22 is a view showing the handle post and handle held upright in a collapsed size.
Figure 24:
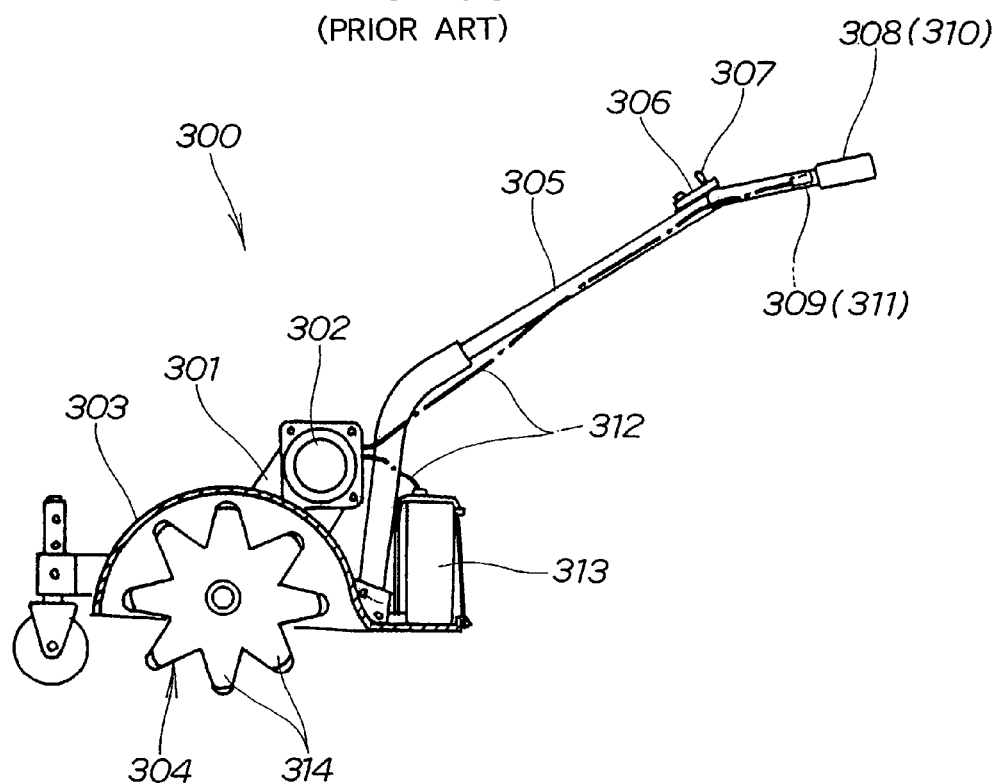
FIG. 24 is a view showing a second example of the conventional electric working machines.

FIG. 22 shows the operating handle section 18 in the collapsed state. In this state, the collapsed operating handle section 18 is held in an upright position at its three spots, i.e. the end surface 131*a* of the stopper ring 131 and the respective distal end portions 78 and 88 of the left and right grip sections 71B and 81B.

By moving the handle 124 to the proximal end portion 122*a* of the post 122 and collapsing the handle section 18 into about half the in-use length L1 (see FIG. 2), the handle section 18 can have a significantly-reduced height H when it is held upright on the ground surface or floor surface 171. Further, holding the operating handle section 18 upright can significantly reduce a horizontal dimension L3 of the section 18 on the ground surface or floor surface.

By removing or detaching the operating handle section 18 from the machine body frame 17 and collapsing the removed handle section 18 in the above-described manner, it is possible to reduce the size of a necessary storage space of the walk-behind electric cultivating machine 10.

Whereas the walk-behind electric cultivating machine 10 of the present invention has been described in relation to the case where the control section 102 provided on the machine body operates in response to signals transmitted from the operating handle section 18 via wireless communication, the present invention is not limited to such a wireless-type electric cultivating machine 10 alone. Even where the basic principles of the present invention are applied to a wired-type walk-behind electric cultivating machine, there can be achieved the same benefit of reducing the size of the necessary storage space.

In the case where the basic principles of the present invention are applied to a wired-type walk-behind electric cultivating machine, a handle-side wire harness may be connected to the handle (post)-side terminal and a machine-body-side wire harness may be connected to the machine-body-side terminal, so that no separate connectors for connecting the machine-body-side wire harness and handle-side wire harness is required. Thus, no troublesome operation is necessary for disconnecting the connectors to thereby disconnect the machine-body-side wire harness segment and handle-side wire harness segment, when the handle post is to be detached from the handle support section.

Whereas the embodiment has been described above as collapsing and holding the operating handle section 18 on the ground surface or floor surface 171 by first removing the handle post 122 from the handle support section 51 of the machine body frame 17, then sliding the handle 124 to the proximal end portion 122*a* of the post 122 and then collapsing the handle section 18 to hold the collapsed handle section 18 on the ground surface or floor surface 171 in the collapsed size, the present invention is not so limited and may employ another operation sequence of first sliding the handle 124 to the proximal end portion 122*a* of the post 122, then removing the handle post 122 from the handle support section 51 of the machine body frame 17 and then collapsing the handle section 18 to hold the collapsed handle section 18 on the ground surface or floor surface 171 in the collapsed size.

Furthermore, the locking mechanism 112 for attaching the upper cover 15 and fender 14 to the cleaning box 111 has been described above as including the pair of rear locking projection sections 113 provided on the upper cover 15. However, the present invention is not so limited; for example, the pair locking projection sections 113 may be provided on the fender 14.

The described embodiment of the electric cultivating machine 10 can be summed up below with reference to FIGS. 4 to 8. The present invention is characterized in that the transmission mechanism 40 is positioned immediately below the downwardly-extending motor rotation shaft ha and the batteries 31 are positioned around and adjacent to the motor 11. With such arrangements, not only the heavy motor 11 but also the heavy batteries 31 can be positioned almost immediately above the cultivating claws 13 and close to the center of gravity Gr of the walk-behind electric cultivating machine 10.

Namely, as illustrated in FIGS. 4 and 6, the center of gravity Gr of the electric cultivating machine 10 is located between the centerline Cm of the motor 11 and the centerline Cs of the cultivating shaft 12 and on the machine body centerline CL, so that the electric cultivating machine 10 equipped with the batteries 31 can present an enhanced weight balance, thereby limiting undesired "meandering" of the machine and enhancing the linear traveling capability and operability of the machine. As a consequence, the present invention can significantly lower the burdens on the human operator and yet achieve an enhanced cultivating performance and finish.

Further, in the present invention, the weight of the batteries 31 acts on the cultivating claws 13 from immediately above, so that the human operator does not have to support the weight of the batteries 31 and the burdens on the human operator can be further reduced. Therefore, the cultivating claws 13 can achieve an improved earth-biting capability, i.e. can bite into the earth with an increased efficiency and reliability, to thereby reliably avoid undesired dashing due to a cultivation reaction force that is given from the earth in response to the cultivating force. In addition, the inventive arrangements can increase the cultivating depth of the cultivating claws 13, thereby improving the cultivating performance.

Further, even where the walk-behind electric cultivating machine 10 is relatively light in weight, there is no need to provide a heavyweight object, such as a counterweight, in front of or above the cultivating claws 13 in order to increase weight distribution to the claws 13.

Furthermore, because the batteries 31 are positioned distributively adjacent to both of the left and right sides of the motor 11, the weight of the batteries 31 acts substantially uniformly on the left and right cultivating claws 13. Therefore, the left and right cultivating claws 13 can bite into the earth substantially uniformly, so that left and right cultivation reaction forces acting on the cultivating machine 10 can be made generally equal. As a consequence, it is possible to limit "rolling" of the cultivating machine 10 about a front-to-rear axis passing the center of gravity Gr of the machine 10, and thus the undesired "meandering" of the cultivating machine 10 can be avoided more effectively, which thereby enhances the linear traveling capability and operability of the machine 10.

Furthermore, with some of the batteries 31 disposed distributively in front of the electric motor 11, the weight of the batteries 31 acts on front portions of the cultivating claws 13 so that the cultivating claws 13 can bite into the earth with an increased efficiency, which thereby suppresses the dashing even more effectively.

Because the plurality of batteries 31 are placed on the fender 14 covering upper portions of the cultivating claws 13, the fender 14 can serve also as a battery support, and thus there is no need to provide a separate battery support.

Furthermore, with the relatively bulky batteries 31 placed on the fender 14 making efficient use of an empty space over the fender 14, the cultivating machine 10 can be effectively reduced in size.

Moreover, with the heavy batteries 31 disposed at as low a position as possible, the center of gravity Gr of the cultivating machine 10 can be set at a lower position, which can suppress the rolling even more effectively to thereby achieve the linear traveling capability of the machine 10.

Figure 13:
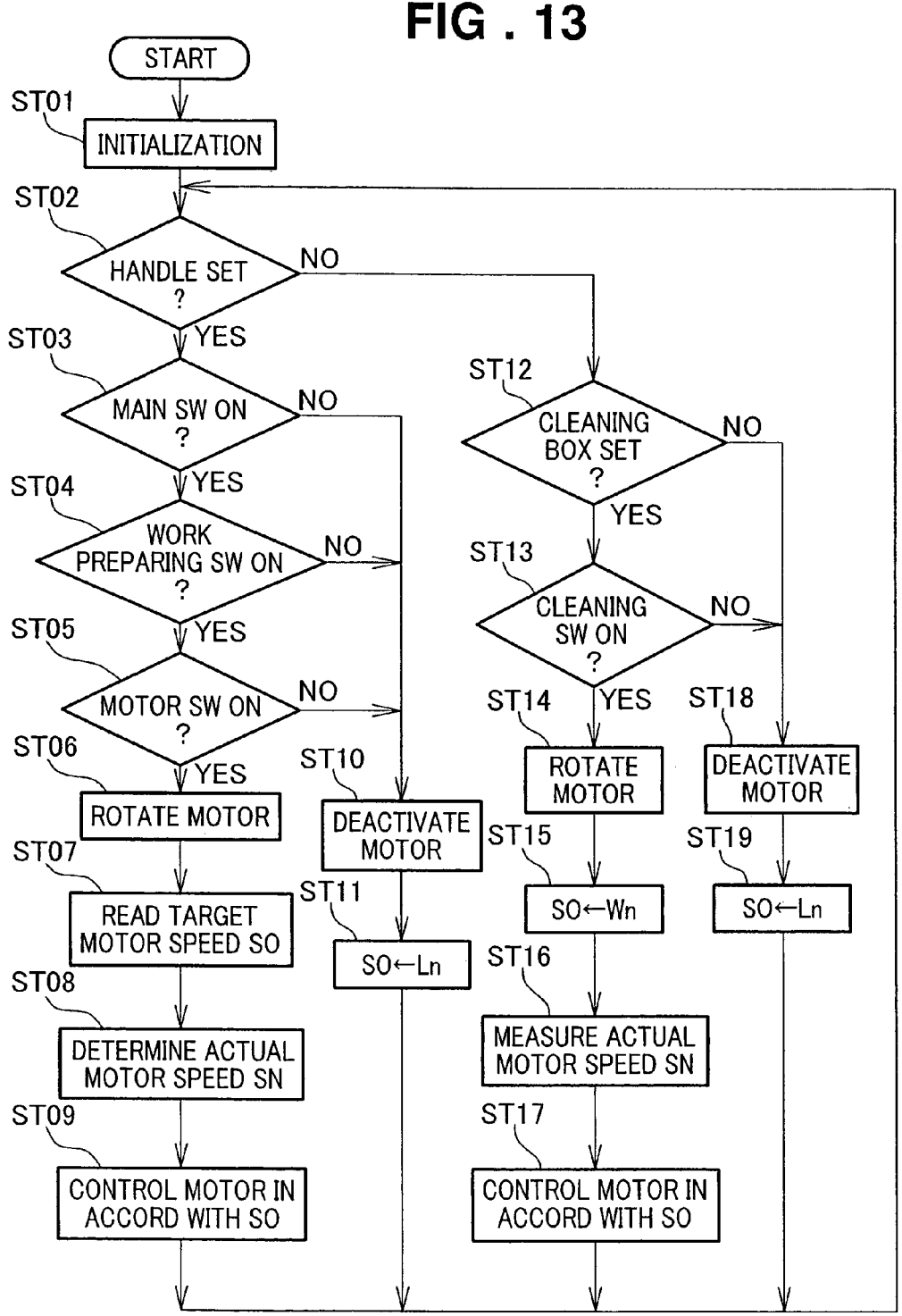
FIG. 13 is a flow chart explanatory of example behavior of a control section in the electric working machine of the invention shown in FIG. 12.

As clear from FIGS. 9, 12 and 13, the work preparing lever 82 is provided on the underside of one of the left and right grip members 70, 80, and the work starting operation button 72 is provided on a portion of the other of the left and right grip members 80, 70 close to the longitudinal centerline CL of the machine body. Also, the control section 102 controls the motor 11 to start rotating on condition that the human operator has operated not only the work preparing lever 82 but also the work starting operation button 72. Thus, in performing desired cultivating work by means of the walk-behind electric cultivating machine 10, the motor 11 can be activated by the human operator grasping the left and right grip members 70 and 80 with both hands LH and RH as illustrated in FIG. 9, operating (pulling) the work preparing lever 82 with the pointing finger Fi of one of the hands RH and operating (depresses) the work starting operation button 72 with the thumb Th of the other hand LH Because the present invention employs such a dual operation scheme requiring operation of both the work preparing lever 82 and work starting operation button 72, the motor 11 can be activated only when the human operator actually so desires.

Furthermore, because the work preparing lever 82 and work starting operation button 72 are positioned distributively on the left and right grip members 70, 80, the human operator can perform two operations, i.e. operation of the work preparing lever 82 and operation of the work starting operation button 72, using both hands LH and RH; that is, the two operations can be prevented from concentrating on only one of the hands grasping the grip members 70 and 80. Namely, the human operator does not have to perform the two operations using only one of the hands grasping the grip members 70 and 80, and these two operations are facilitated. Therefore, the dual operations for rotating the motor 11 can be performed with an increased ease, which can enhance the operability of the cultivating machine 10 and reduce the burdens on the human operator.

Furthermore, because the work starting operation button 72 is provided on a portion of the left or right grip member 70 or 80 close to the machine body centerline CL, the operation button 72 can be operated with an increased ease by the thumb Th of the hand grasping that grip member.

As clear from FIGS. 1, 6, 9 and 12, the present invention is also characterized by provision of the transmitters 77 and 95 for transmitting, as radio signals, operation signals generated through operation of the operating members 72, 73, 82 and 83. As illustrated in FIG. 1, the receiver 62 for receiving the radio signals from the transmitters 77 and 95 is provided on the machine body frame (specifically, on the upper cover 15 provided on the machine body frame 17). Therefore, neither wire cable nor wire harness is required for connecting the operation members 72, 73, 82 and 83 and the machine body frame 17 as in the conventional machines.

As a result, there is no need to give extra considerations to handling of a wire cable and wire harness at the time of adjustment or removable of the operating handle section 18. Also, it is not necessary to take into account aging of a wire cable and wire harness, and thus the walk-behind electric cultivating machine 10 can be simplified in structure. As shown in FIG. 6, for example, the operating handle section 18 can be mounted in the handle support section 51 when the cultivating machine 10 is to be used, and the handle section 18 can be freely removed from the handle support section 51 when the machine 10 is to be stored in a desired space.

Because the operating handle section 18 is slidable longitudinally relative to the handle support section 51, an appropriate height of the grip members 70 and 80 can be set in accordance with the height and preference of the human operator.

Whereas the preferred embodiment has been described in relation to the case where the work preparing lever 82 is in the form of a trigger, the lever 82 may be a lever held by the human operator together with, for example, the grip 80. Any desired number of the speed changing buttons 83 may be chosen as desired.

The receiver 62 and control section 102 may be mounted directly on the machine body frame 17, rather than on the upper cover 15.

The control section 102 is typically implemented by a microcomputer operating on control programs; in an alternative, the control section 102 may be implemented by hardware circuitry to which various switches operable via the respective operating members 72, 73, 82, 83 are connected.

Obviously, various minor changes and modifications of the present invention are possible in the light of the above teaching. It is therefore to be understood that within the scope of the appended claims the invention may be practiced otherwise than as specifically described.

What is claimed is:

1. A walk-behind electric working machine comprising:

a machine body frame;

an electric motor mounted on the machine body frame;

a handle support section mounted on the machine body frame;

a handle post having a first end portion removably connected to the handle support section and a second end portion;

a handle having first and second handle portions and first and second grip members mounted on the respective first and second handle portions and configured to be gripped by respective hands of an operator of the walk-behind electric working machine, the handle being removably mounted on the handle post for sliding movement between the first and second end portions of the handle post to adjust a distance of the grip members relative to a ground surface on which the walk-behind electric working machine is operated in accordance with a height of the operator;

a locking mechanism for locking the handle relative to the handle post at a preselected position between the first and second end portions of the handle post; and an operation button mounted on the first grip member for actuation by a finger of one hand of the operator for controlling power to operate the electric motor while the one hand grips the grip member on which the operation button is mounted.

2. A walk-behind electric working machine according to claim 1; further comprising a lever for operating the electric motor, the lever being mounted on the second grip member for operation by a finger of the other hand of the operator to operate the working unit while the other hand grips the grip portion of the second grip member.

3. A walk-behind electric working machine according to claim 2; further comprising a control section for activating the electric motor only when both the operation button and the lever are operated by the operator.

* * * * *